US007937955B2

(12) United States Patent
Tsao

(10) Patent No.: US 7,937,955 B2
(45) Date of Patent: May 10, 2011

(54) SOLAR AND WIND HYBRID POWERED AIR-CONDITIONING/REFRIGERATION, SPACE-HEATING, HOT WATER SUPPLY AND ELECTRICITY GENERATION SYSTEM

(75) Inventor: Jason Tsao, Torrance, CA (US)

(73) Assignee: Jason Tsao, Torrance, CA (US)

( * ) Notice: Subject to any disclaimer, the term of this patent is extended or adjusted under 35 U.S.C. 154(b) by 0 days.

(21) Appl. No.: 12/684,688

(22) Filed: Jan. 8, 2010

(65) Prior Publication Data
US 2010/0107633 A1 May 6, 2010

(51) Int. Cl.
F25B 9/00 (2006.01)
A47C 7/74 (2006.01)
F03D 9/00 (2006.01)

(52) U.S. Cl. .............................. 62/6; 416/146 R; 290/44

(58) Field of Classification Search ............. 62/6, 324.6; 60/641.8; 416/31, 146 R; 290/44, 55; 136/248
See application file for complete search history.

(56) References Cited

U.S. PATENT DOCUMENTS

| | | |
|---|---|---|
| 3,994,136 A | 11/1976 | Polster |
| 4,044,558 A | 8/1977 | Benson |
| 4,229,941 A | 10/1980 | Hope |
| 4,278,896 A | 7/1981 | McFarland |
| 4,319,141 A | 3/1982 | Schmugge |
| 4,395,880 A | 8/1983 | Berchowitz |
| 5,103,646 A | 4/1992 | Fini |
| 6,097,104 A | 8/2000 | Russell |
| 6,984,899 B1 | 1/2006 | Rice |
| 7,134,279 B2 | 11/2006 | White et al. |
| 7,171,811 B1 | 2/2007 | Berchowitz et al. |
| 7,438,533 B2 | 10/2008 | Eyb et al. |
| 7,453,167 B2 | 11/2008 | Gilbert |
| 7,484,366 B2 | 2/2009 | Mori |
| 7,488,150 B2 | 2/2009 | Krippene |
| 7,851,935 B2 * | 12/2010 | Tsao ............................... 290/44 |

FOREIGN PATENT DOCUMENTS

DE 10010258 A1 * 6/2001
JP 11237138 A * 8/1999

OTHER PUBLICATIONS

Ewert, et al., "Experimental Evaluation of a Solar PV Refrigerator with Thermoelectric, Stirling and Vapor Compression Heat Pumps", 1999.
Kosack, et al, "System Theoretical Analysis of Decentralized Energy Systems for Residential Buildings", World Climate & Energy Event, Jan. 6-11, 2002.
Pyper, W. "A Stirling Idea" ECOS, pp. 28-30 (2005).
Minassians, A. "Stirling Engines for Low-Temperature Solar-Thermal-Electric Power Generation" http://www.eecs.berkeley.edu/Pubs/TechRpts/2007/EEFCS-2007-172.html (2007).

* cited by examiner

Primary Examiner — Chen-Wen Jiang
(74) Attorney, Agent, or Firm — Occhiuti Rohlicek & Tsao LLP

(57) ABSTRACT

A system for environmental control includes a hybrid wind and solar energy collection subsystem; a temperature control subsystem having a thermo-mechanical engine; an electrical generating subsystem; a sensor for detecting an environmental condition; and a controller for receiving information representing an environmental condition from the sensor. The controller is programmed to detect a change in an environmental condition, and in response to the change, to selectively connect the hybrid wind and solar energy collection subsystem to one of the temperature control subsystem and the electrical generating subsystem and to selectively disconnect the hybrid wind and solar energy collection subsystem from the other of the temperature control subsystem and the electrical generating subsystem.

19 Claims, 28 Drawing Sheets

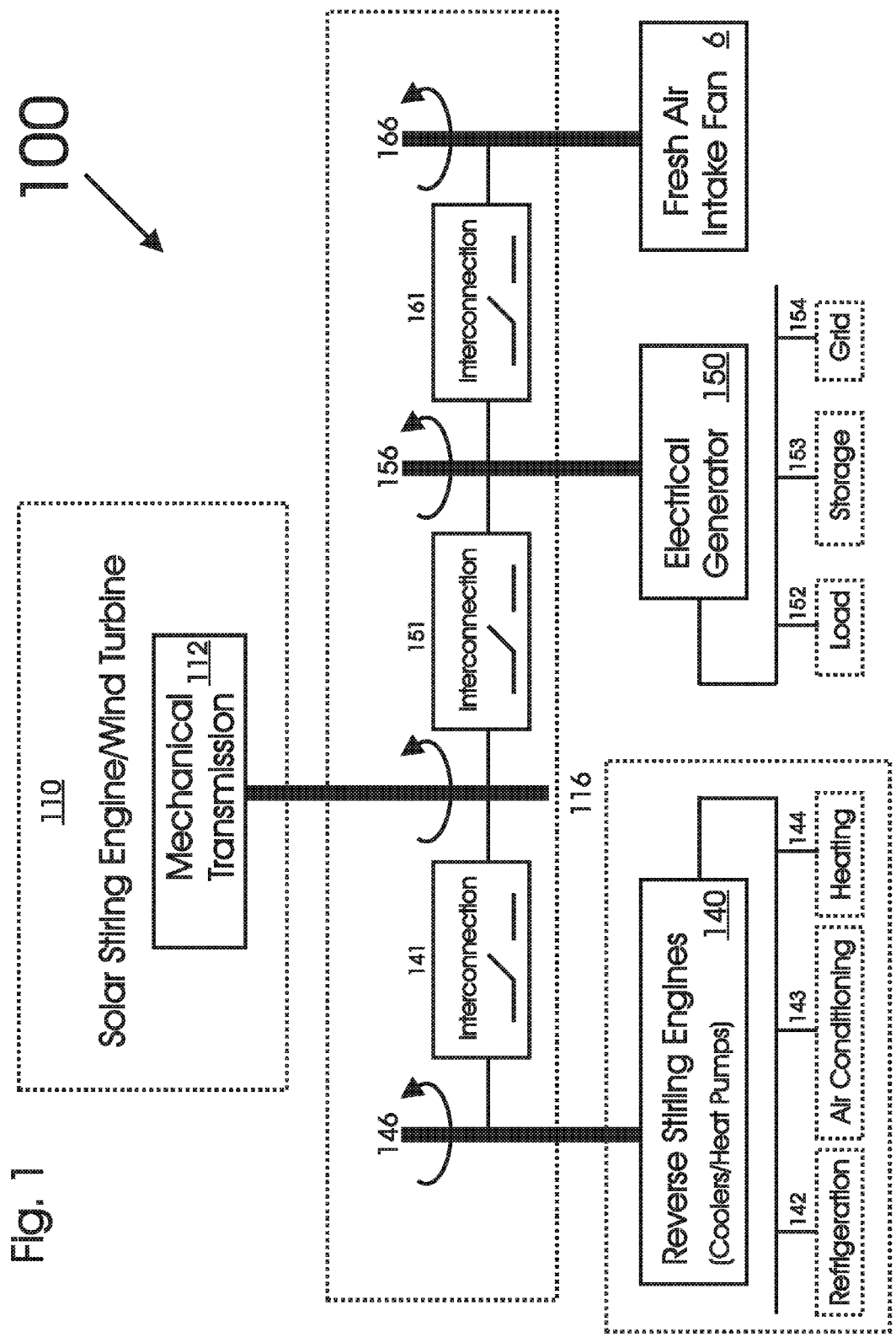

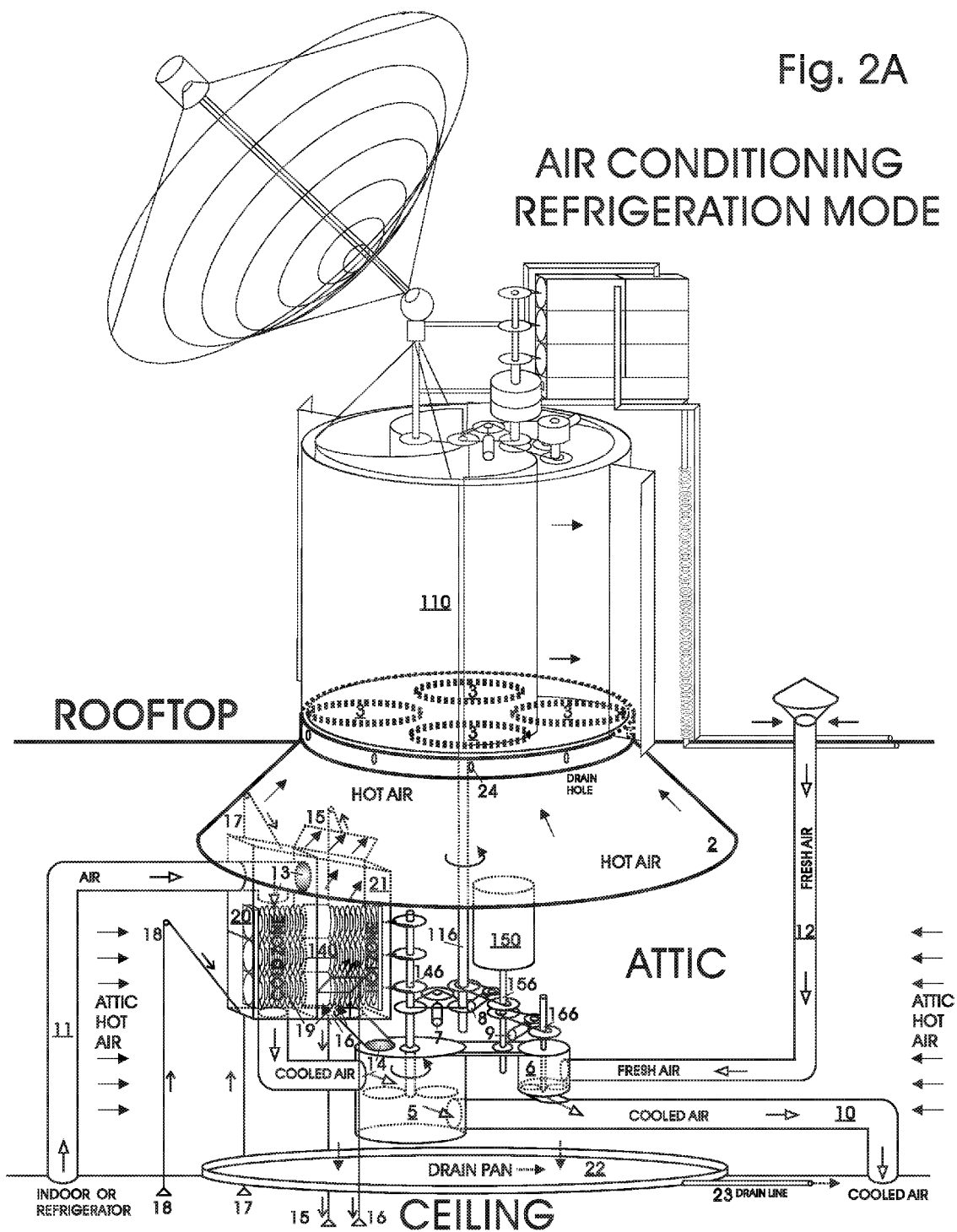

SPACE HEATING MODE

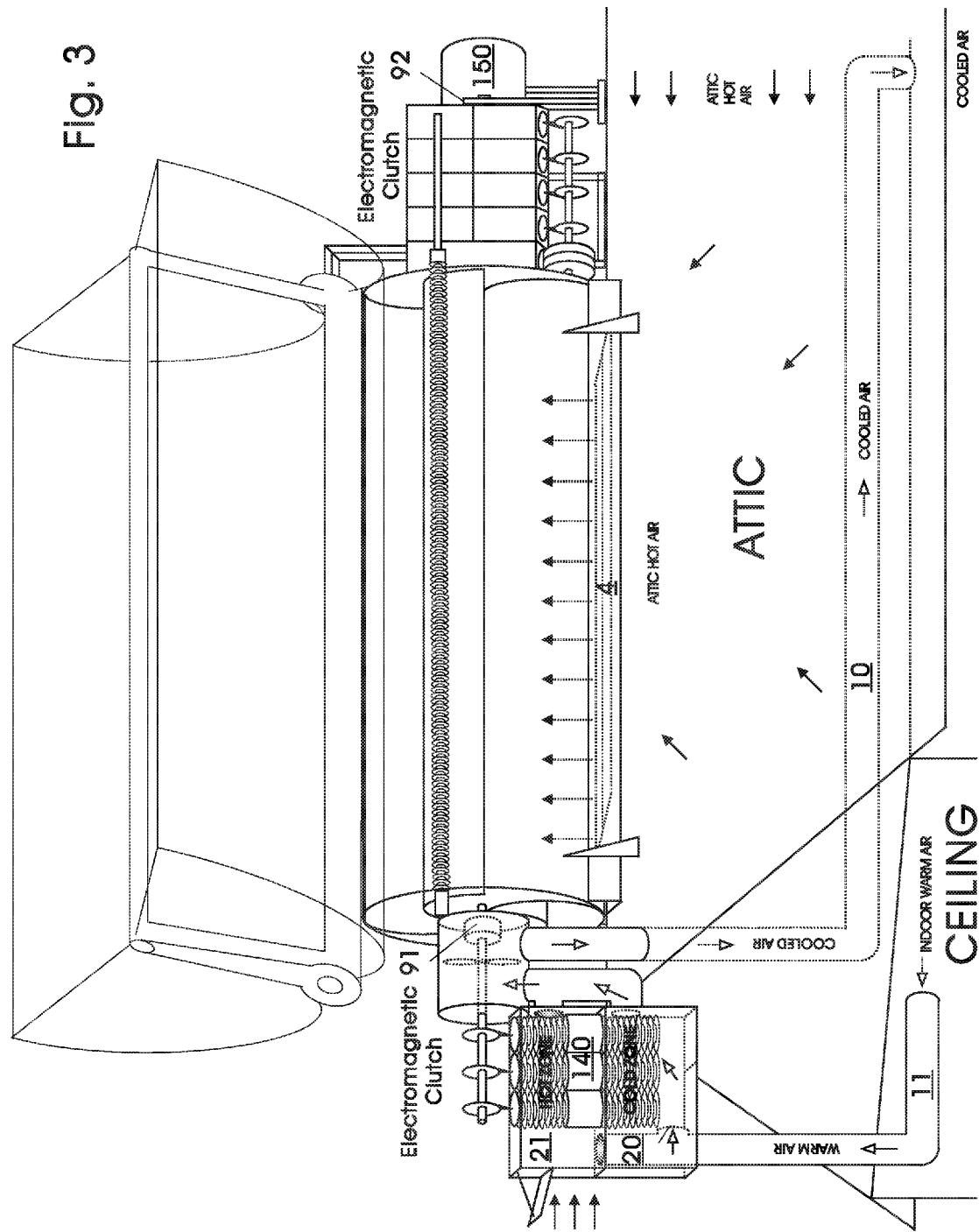

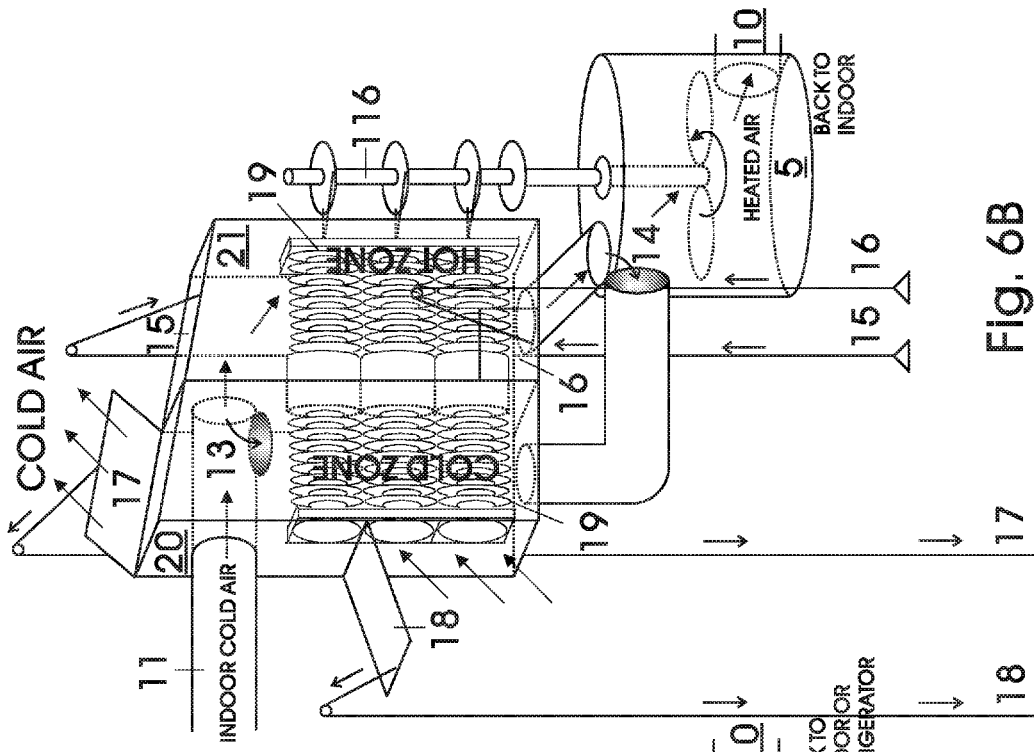
Fig. 6A Air Conditioning/Refrigeration Mode
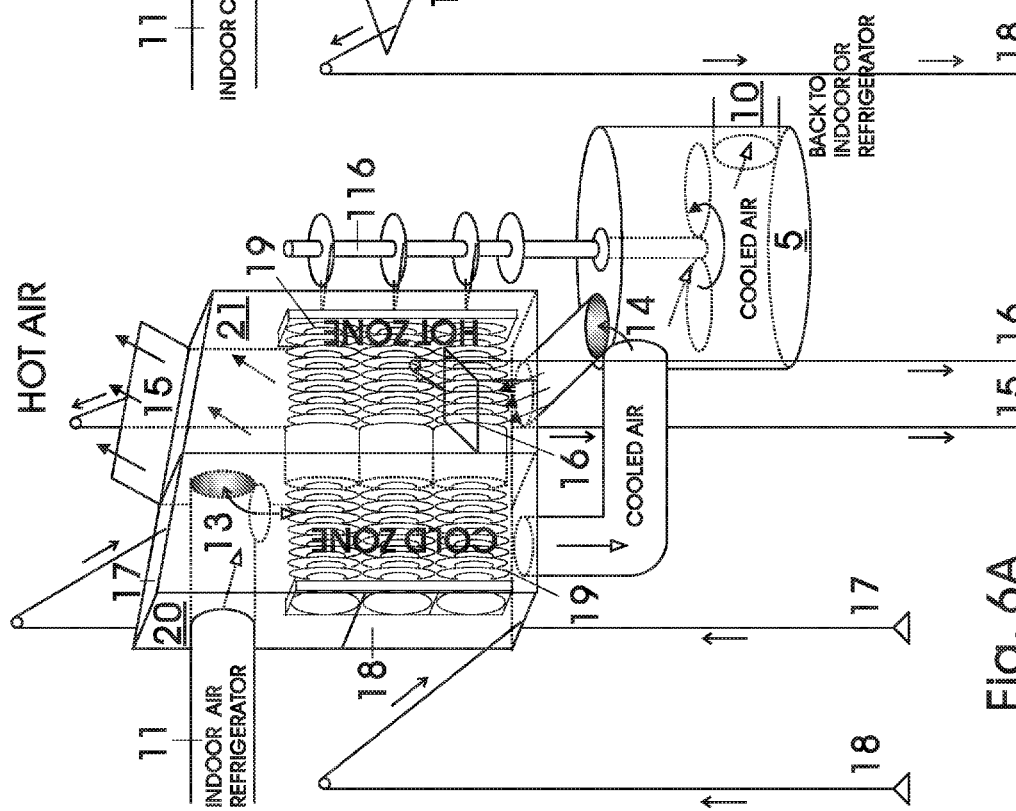
Fig. 6B Space Heating Mode

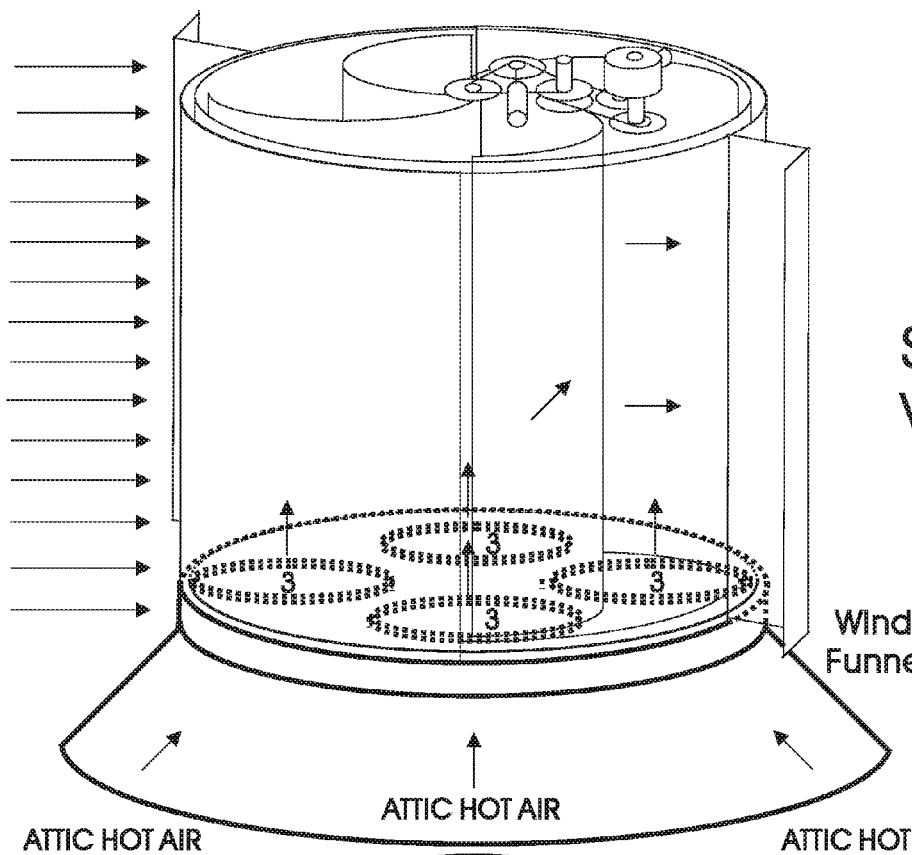
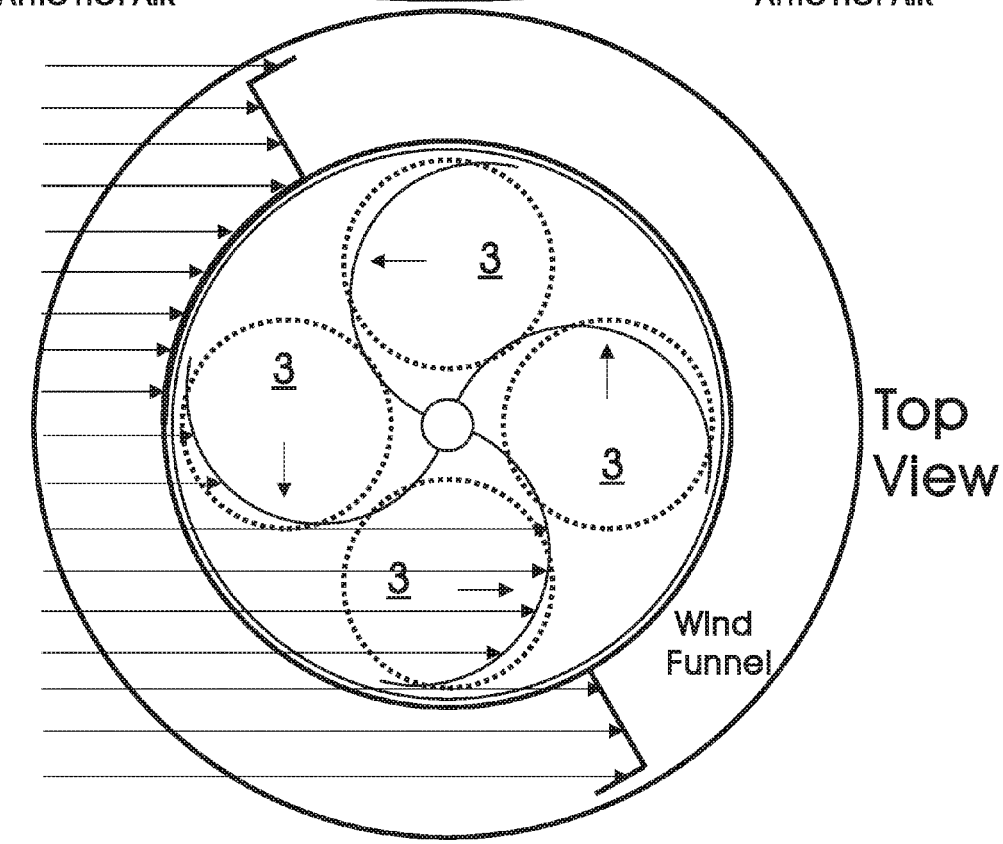
Fig. 7
Side View
Top View
Wind Funnel
ATTIC HOT AIR  ATTIC HOT AIR  ATTIC HOT AIR

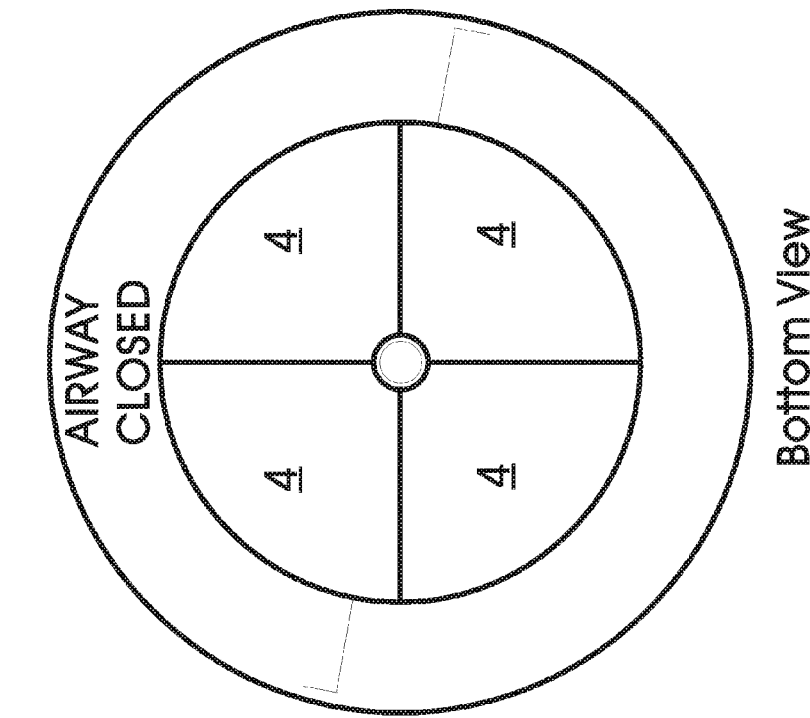
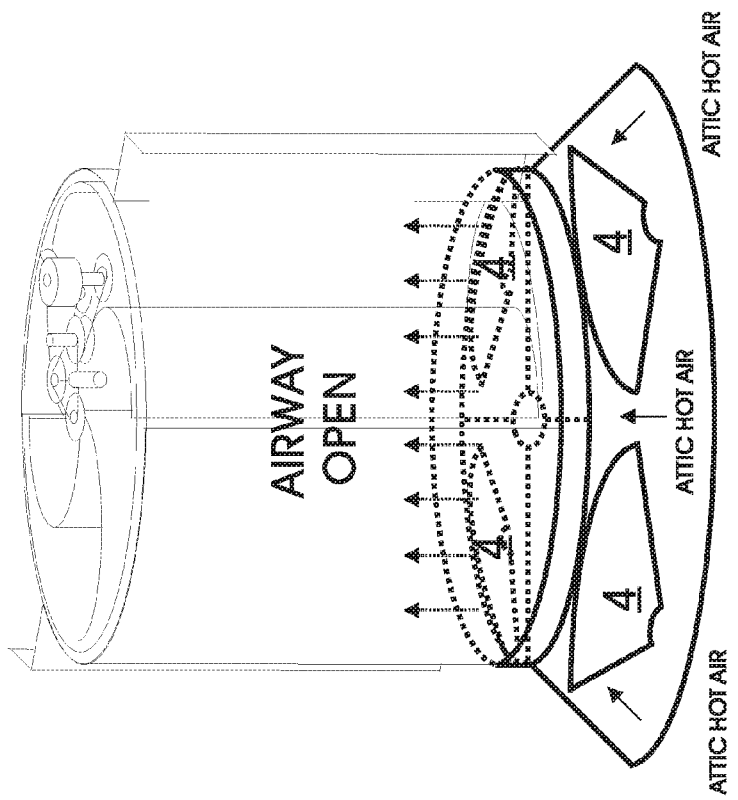
Fig. 8B

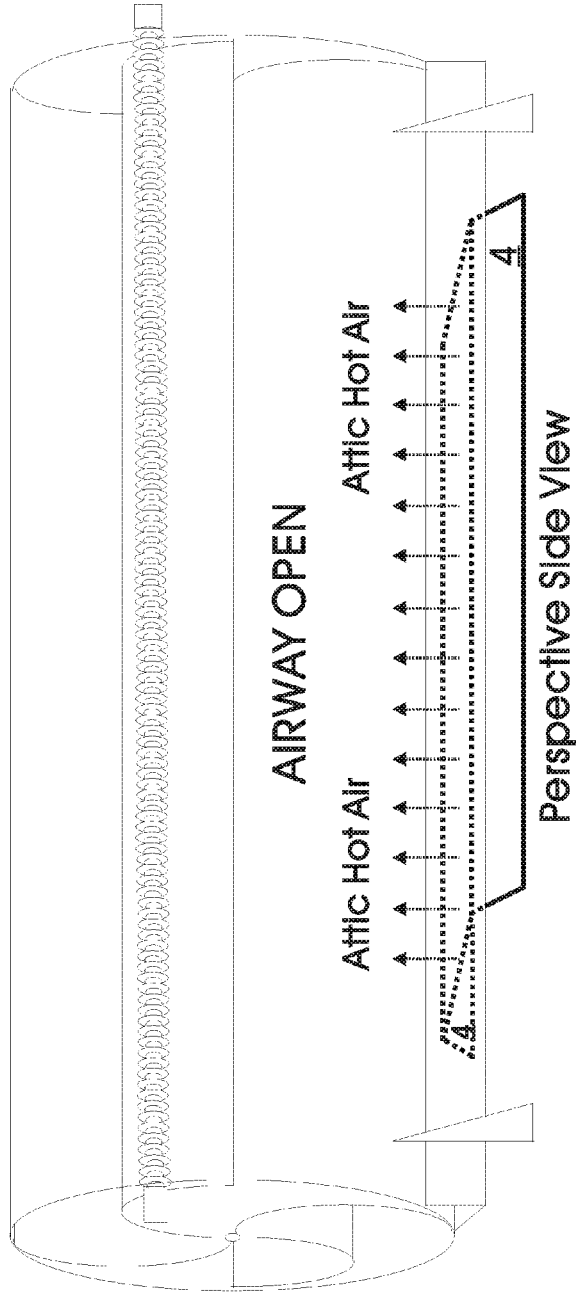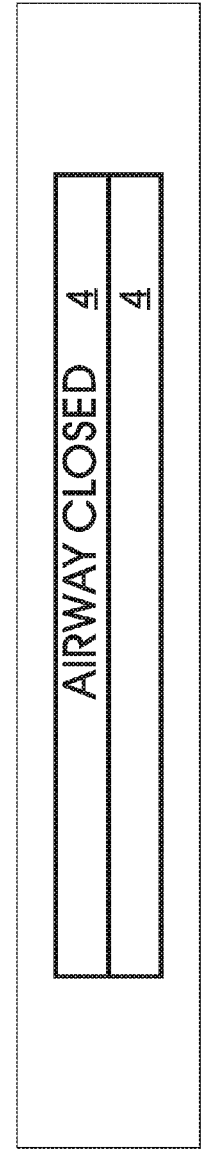
Fig. 8C

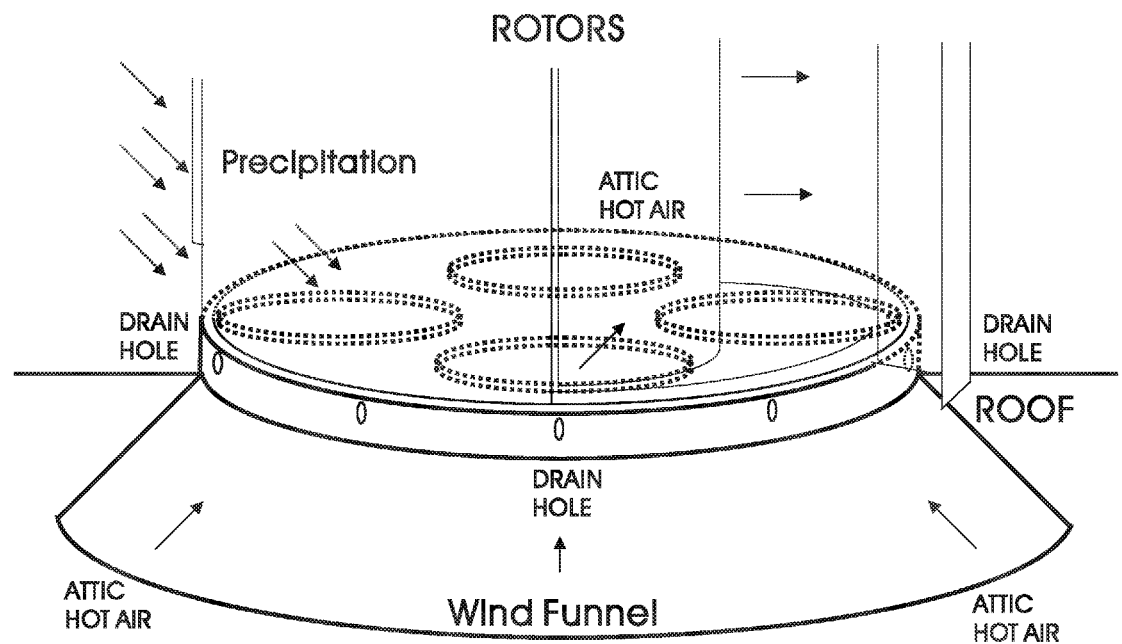
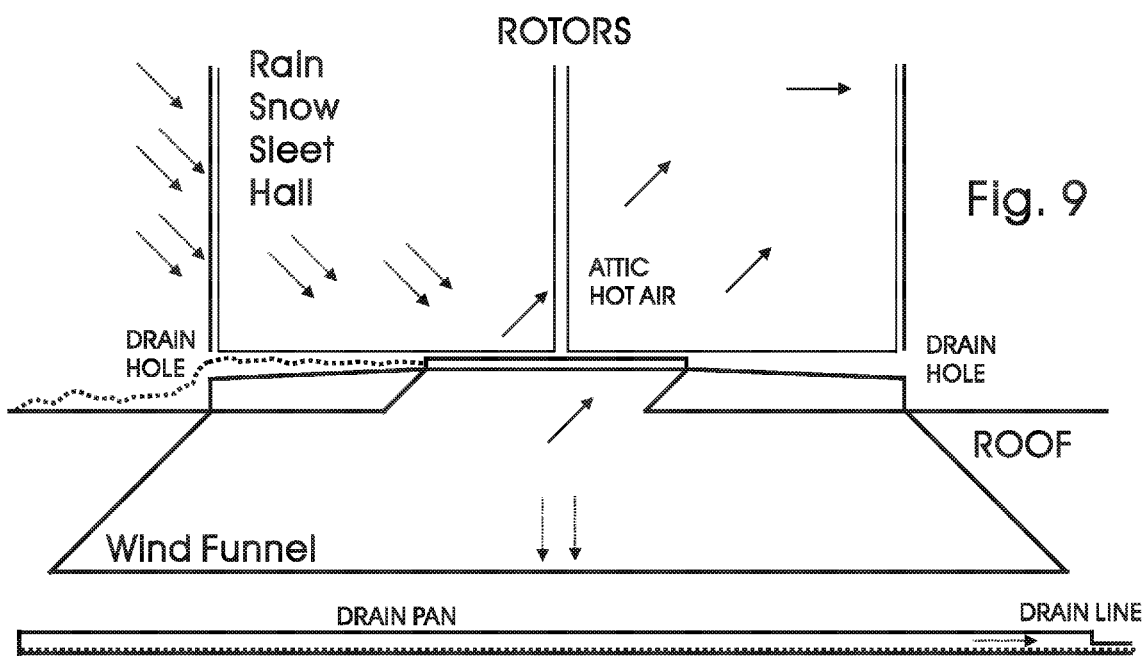
Fig. 9

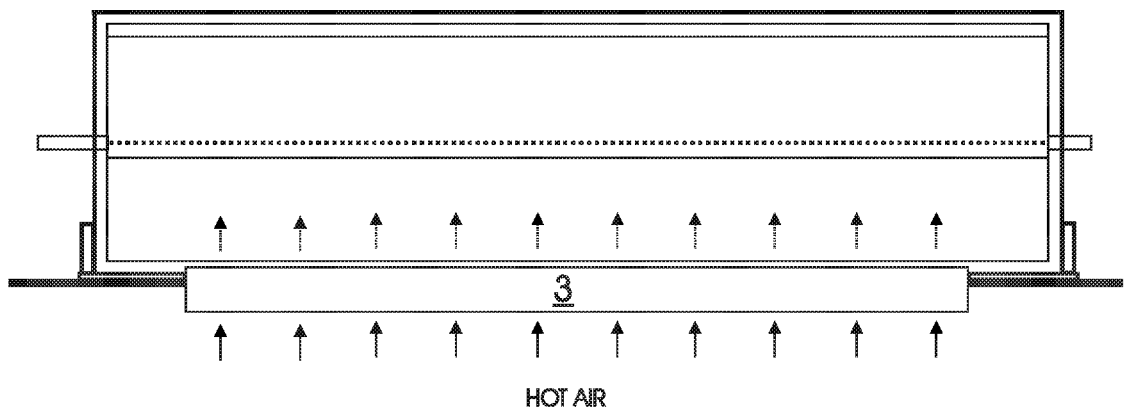
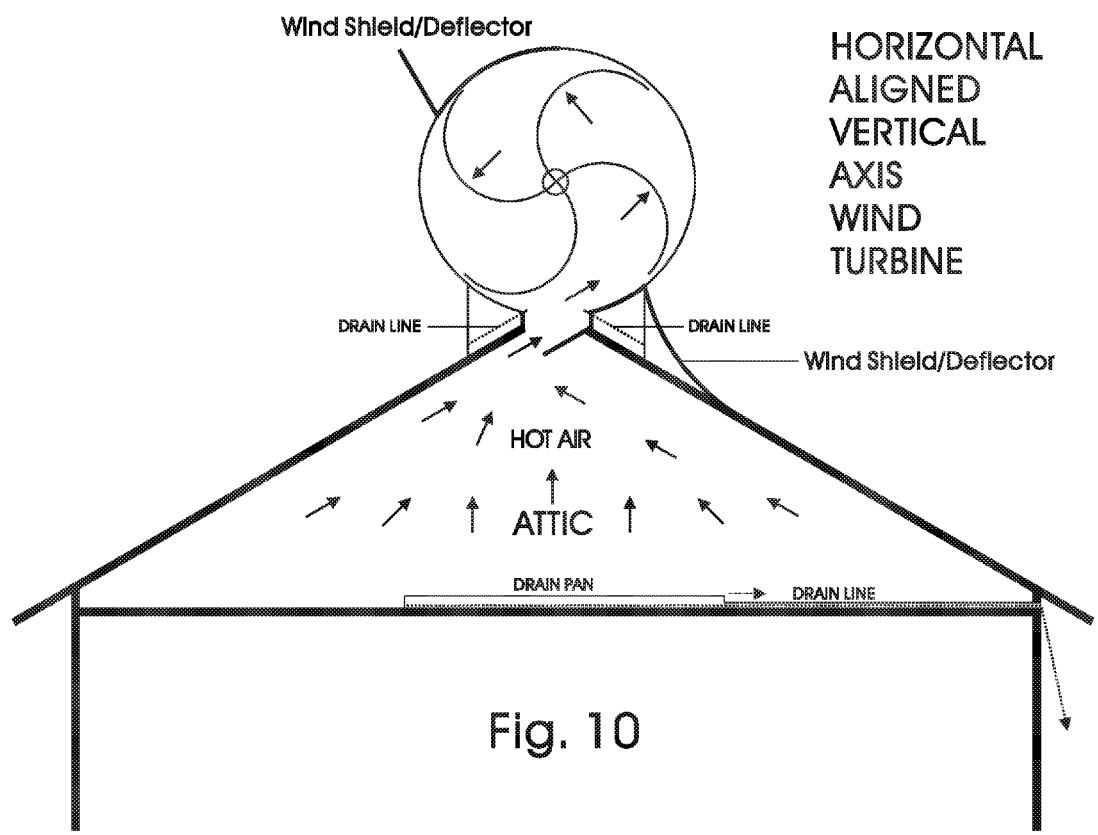
Fig. 10

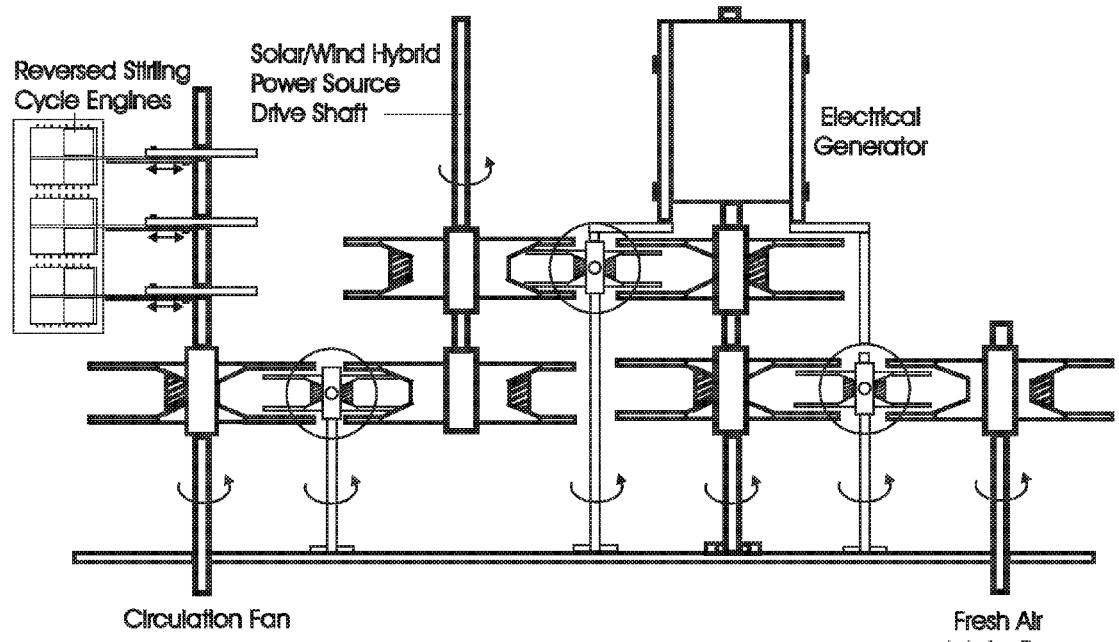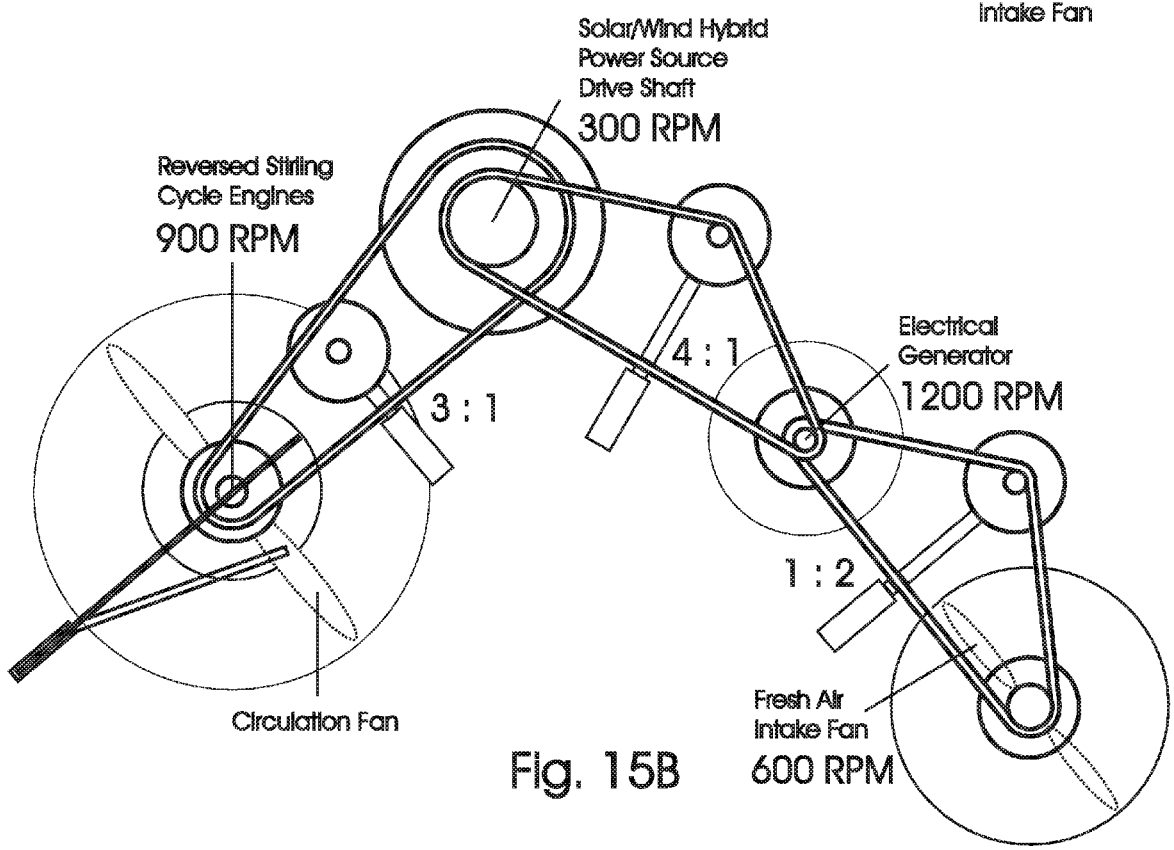
Fig. 15B

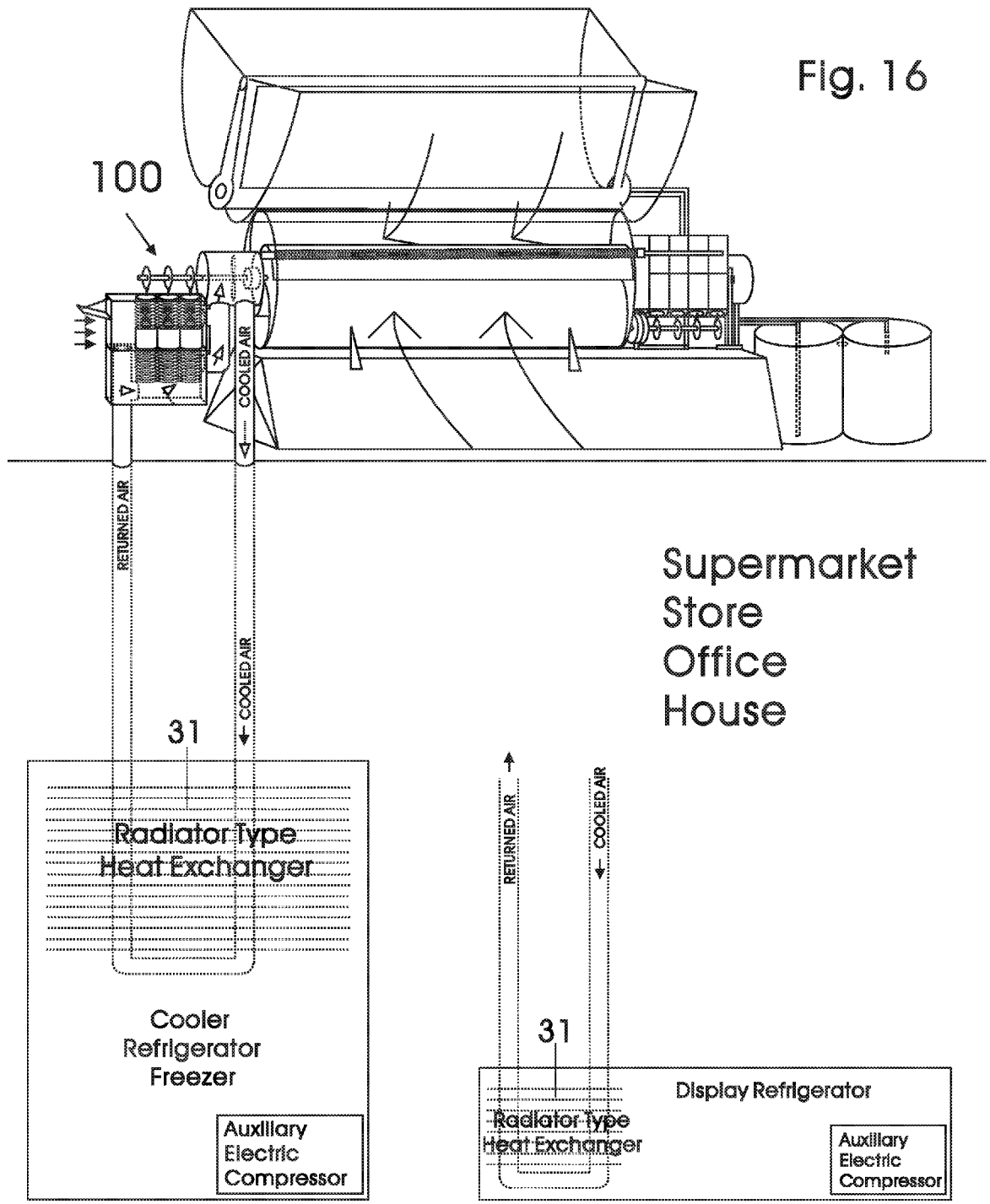

SOLAR AND WIND HYBRID POWERED AIR-CONDITIONING/REFRIGERATION, SPACE-HEATING, HOT WATER SUPPLY AND ELECTRICITY GENERATION SYSTEM

FIELD OF DISCLOSURE

This application relates to energy from renewable resources, and in particular to systems and methods for solar and wind hybrid energy powered air-conditioning/refrigeration and space-heating and hot water supply and electricity generation.

BACKGROUND

In much of the developed world, air-conditioning has become a near necessity. In the U.S., most newly constructed housing units are centrally air-conditioned. Many dwelling units in the U.S. have central air-conditioning and/or one or more room air-conditioners. Virtually all-commercial building space in the U.S. is air-conditioned.

As a result of air-conditioning's widespread use, electrical energy consumed by air-conditioning amounts to at least 50% of total annual residential use. The contribution of residential air-conditioning to the peak power consumption is even more significant, approaching 80% of residential peak power demand and 60% in the commercial sector. Refrigeration for commercial and residential use is the second major source of electricity consumption.

In cold climates, the energy consumed for space-heating and hot water supply represents a high percentage of the total energy consumption in service sector buildings, and an even higher percentage in the residential buildings.

SUMMARY

The system disclosed herein features subsystems that use different renewable energy sources as inputs and that use that energy to generate electrical energy or to carry out heat transfer.

In general, an energy-producing plant for residential and small commercial buildings would supply electrical energy, and heat transfer services (e.g. space-heating and cooling, and refrigeration, and hot water supply), while generating a minimum of noise and vibration within the building.

Some general aspects of the systems and methods disclosed herein relate to systems and methods for providing an integrated and complementary energy generating system capable of converting wind and solar energy into energy for use with at least one of air-conditioning, refrigeration, space-heating, hot water supply, and electricity generation. In hot weather and during the daytime, such hybrid systems concurrently convert both wind and solar energy to provide power to an air-conditioning/refrigeration unit. During the nighttime, the systems can continuously harvest wind energy to generate electricity regardless of the absence of sunlight. As the peak of electricity consumption (e.g., air-conditioning and refrigeration) and sunlight tends to occur at same times of the day and year, the solar and wind energy powered air-conditioner work best precisely at those times in which they are needed most. The solar and wind energy also complement each other and produce more power in the daytime for urban and suburban areas when electricity demand is usually higher.

In some examples, in cold climate and high heating demand areas, the system also provides space-heating in addition to electricity generation.

When the thermal energy received by solar collector of the subsystem is converted into mechanical energy, during this process hot water is a byproduct and ready for residential and commercial use all year round.

A system described in co-pending U.S. patent application Ser. No. 12/539,426 (the contents of which are herein incorporated by reference) includes wind and solar powered subsystems having a rotor/vane for receiving wind to generate mechanical energy, and a solar powered apparatus having a solar collector for receiving solar energy to generate thermal energy, a thermo-mechanical engine coupled to the solar collector for converting the generated thermal energy into mechanical energy, and a shaft mechanically coupled between the rotor and solar powered Stirling engines to combine the mechanical energy generated by the wind powered subsystem with energy generated by the solar powered subsystem.

If supplied with mechanical power, a Stirling cycle engine can function in reverse as a heat pump for heating or as a cooler for cooling. Unlike a vapor compression system outfitted with capillary tubes, the performance of which is optimized at only one temperature, Stirling heat pumps/coolers maintain their high performance over a wide range of temperature conditions.

The system includes a reversed Stirling cycle engine that uses mechanical energy to extract heat from its target volume (dwelling or refrigerator). Because of this heat extraction effect, the heat acceptor of the reversed Stirling engine gets colder and colder as more and more power is provided to the engine (Stirling Cooler) to pump the heat that is absorbed from the target volume (dwelling or refrigerator) away from the system that serves as an air-conditioner to the dwelling in hot days or serves as a refrigerator.

The heat pump usually operates at room temperature. One of its applications is that of pumping heat from the attic or outside of a room to the inside, thus cheaply heating it. Heat pumps are an energy-efficient type of heating system. Stirling cycle heat pumps also often have a higher coefficient of performance than conventional Freon based heat pumps.

The system also includes an electricity generation subsystem.

The system also includes an interconnection subsystem that disengageably couples either the second shaft (reversed Stirling cycle engines) to the first shaft (solar and wind energy converter subsystem) or the third shaft (generator) to the first shaft (solar and wind energy converter subsystem) or the fourth shaft (fresh air intake fan) to the third shaft (generator) for combining the mechanical energy generated by the solar and wind energy converter to be transferred to either the electrical generator or the reversed Stirling cycle engines. As used herein, two constituent structures of an apparatus are "disengagably coupled" if they are configured to be coupled and decoupled during normal operation of the apparatus.

Embodiments of these aspects may include one or more of the following features.

The thermo-mechanical engine subsystem can be a reversed external combustion engine, for instance, having a set of one or more reversed Stirling cycle engines. Each may include a hot zone and a cold zone. A heat sink is provided for both increasing heat absorption area (cold zone) and heat dissipation area (hot zone) of the reversed thermo-mechanical engine.

In some examples, the air circulation system includes two insulated enclosures (cold zone and hot zone) and a rotary fan for forcing the cooled air in the heat exchanger of a cold zone insulated enclosure through a first insulated air duct toward the space of the dwelling or radiator type heat exchanger of refrigerator to be cooled down and subsequently circulates indoor warm air or air in a refrigerator radiator through a second insulated air duct back toward the cold zone of the reversed thermo-mechanical engines (i.e., Stirling coolers).

In other examples, the circulation fan forces the heated air in the heat exchanger of the hot zone insulated enclosure through a first insulated air duct toward the space of the dwelling to be warmed up, and subsequently circulates indoor cold air through a second insulated air duct back to the hot zone of the reversed thermo-mechanical engines (i.e., Stirling heat pumps).

The foregoing system is a forced air and fin heat exchanger system that avoids using any transfer medium (e.g., water, coolant, refrigerant, heat transfer fluid) that might contaminate the environment. The system thus tends in contrast to systems that use heat transfer fluid, which tend to be complicated, expensive and bulky.

In some embodiments, a set of wind chutes inside a wind funnel is located below the bottom of the wind turbine. The wind chutes are configured for expelling hot air from an attic and waste heat generated from the hot zone of the reversed Stirling cycle engines when it is in air-conditioning or refrigeration mode (i.e. operating as a Stirling cooler). The hot air is sucked out by the rotors/vanes of the wind turbine. This lowers both the attic temperature and the energy consumed by the building's air-conditioning and refrigeration systems.

In some embodiments, the shutoff mechanisms of the air chutes serve as airways that may be opened in summer time to expel the heat inside the attic and closed in wintertime to keep the heat inside the attic. The shutoff mechanisms have manual or automated members and a control module. In wintertime, when the system runs in heat pump mode, the heat generated by solar energy is kept inside the attic for the Stirling heat pump to absorb and transfer into the dwelling. The trapped heat in the attic, which is ultimately pumped into the building, greatly enhances the efficiency of the heat pump at space-heating.

In space-heating mode, the cold zone insulated enclosure opens for the cold (e.g., frost, ice deposited on the heat exchanger) for quick dissipation and the hot zone insulated enclosure closes so that the circulation fan forces the heated air into the building. The forced cold dissipation of the cold zone of the Stirling heat pumps using the suction of air by the spinning rotors of the wind turbine through the air chute/funnel greatly enhances the efficiency of the Stirling cycle heat pumps.

In air-conditioning mode, the hot zone insulated enclosure opens for the quick dissipation of heat (e.g., heat comes out from the heat exchanger), the cold zone insulated enclosure closes, and the circulation fan forces cooled air into the building. The forced heat dissipation of the hot zone of the Stirling coolers using the suction of air by the spinning rotors of the wind turbine through air chutes and a funnel greatly enhances the efficiency of the Stirling cycle coolers.

In refrigeration mode, the hot zone insulated enclosure opens for the rapid dissipation of heat (e.g., heat comes out of the heat exchanger), the cold zone insulated enclosure closes, and the circulation fan forces the cooled air into the radiator type heat exchanger of the cooler or refrigerator. The forced heat dissipation of the hot zone of the Stirling refrigerators by the suction of air by the spinning rotors of the wind turbine through air chute/funnel greatly enhances the efficiency of the Stirling cycle refrigerators.

One embodiment of the interconnection subsystem includes a set of pulleys and one or more V-belts for selectively coupling the set of pulleys. A set of electric motors is configured for moving a selected one of the set of pulleys upon activation by a control signal, thereby tightening the V-belts over the set of pulleys to couple the selected drive shaft to another selected drive shaft. The interconnection subsystem may further include a control module for generating the control signal for activating the electric motor in response to environmental and system conditions, for instance, wind conditions, sun conditions, room or refrigerator temperature, and temperature conditions in the cold zone insulated enclosure and hot zone insulated enclosure of the reversed Stirling cycle engines. In some examples, the control module includes an anemometer, temperature sensors for detecting the temperature of the system and thermostats in the building, cooler or refrigerator.

In some embodiments, the pulleys in a set of pulleys have different diameters thus having different gear ratios. The rotational frequency (revolutions per minute) of each driving pulley may be pre-determined and changeable for maximizing the system efficiency.

Another aspect of the systems and methods disclosed herein relates to methods that include obtaining measurements characterizing an environmental condition (e.g., a room or refrigerator temperature condition, a wind condition, a sun condition), and determining whether an activation condition is satisfied according to the obtained measurements. Upon satisfaction of the activation condition, the second shaft is engaged to the first shaft for transferring the combined mechanical energy to the reversed Stirling cycle engines (Stirling coolers or heat pumps) and is disengaged from the shaft of the electrical generator to stop transfer of the mechanical energy generated by the hybrid solar/wind power subsystem to an electrical generator. The method also includes determining whether a deactivation condition is satisfied according to the obtained measurements. Upon satisfaction of the deactivation condition, the driving shaft of the hybrid solar/wind power subsystem is disengaged from the shaft of the reversed Stirling cycle engines to stop transfer of the mechanical energy generated by the hybrid solar/wind power subsystem to the Stirling coolers/heat pumps and is engaged to the shaft of the electrical generator to transfer of the mechanical energy generated by the hybrid solar/wind power subsystem to an electrical generator, and vice-versa.

In some examples, the activation condition is associated with a first threshold temperature, and the deactivation condition is associated with a second threshold temperature in the building or refrigerator.

Another general aspect of the systems and methods disclosed herein relates to the vertical axis wind powered subsystem having a power generating turbine, a shaft and a set of two or more blades rotatably coupled to the shaft, and a wind shield structure fixedly mounted to the periphery of the horizontal aligned operational position wind turbine for directing wind toward a desired region of the power generating wind turbine. The windshield structure includes arcuate-cylindrical members positioned at the same radial distance from a longitudinal axis of the shaft for partially enclosing the set of two or more rotors/vanes/blades. A deflector is mounted at a desired angle to an end of the arcuate-cylindrical member and positioned with respect to the longitudinal axis of the shaft in order to deflect more wind flow into the rotors/vanes/blades of the wind turbine, thereby improving efficiency of energy conversion. This fixed wind shield/deflector can direct the wind flow substantially only to rotors/vanes/blades and block wind flow to the backside of the rotors/vanes/blades, therefore preventing the wind from inhibiting the rotation of the rotors/vanes/blades assembly.

A roof mounted wind shield/deflector is located on the opposite side of the fixed wind shield/deflector structure of the horizontal aligned operational position wind turbine. This second wind shield/deflector directs the wind flow on the rooftop into the rotors/vanes/blades of the wind turbine. The alignment of the system on top of the pitched roof can increase the area available for catching wind to be directed onto wind turbine rotors. The deflected wind flow is along a direction that urges the rotors to rotate in a desired direction. This, in turn, results in greater power output. At least two types of the windshield/deflectors can be symmetrically mounted to both sides of the horizontal aligned operational position wind turbine. When wind flow changes direction, either the wind shields or the deflectors catch and direct more air flow to the turbine, thereby improving efficiency of energy conversion in the event that the turbulent wind flow changes directions frequently, as is common in an urban or suburban area.

Embodiments of various aspects of the system disclosed herein may include one or more of the following features and advantages.

In some applications, an air-conditioning/refrigeration and space-heating system as described herein has better performance than a solar air-conditioner (i.e., a system that combines solar panels, batteries, and a conventional air-conditioner), and better performance than a solar evaporative cooler (i.e. a combination of solar panels, batteries, and an evaporative cooler). Inefficiencies in a conventional solar air-conditioner and evaporative cooler arise because of energy losses associated with transformation of energy from one form to another. Such systems lose energy when solar energy is converted into electrical energy, when the resulting electrical energy is stored in a battery, when it is retrieved from the battery and provided to an inverter for conversion into alternating current (AC), and when it is actually used to perform mechanical work. Typical domestic air-conditioners and refrigerators require upwards of 30 W average power, with start-up surges an order of magnitude higher. This results in high costs for a large battery bank and a large capacity inverter. In addition, such air-conditioners require periodic upkeep because the batteries do not last more than about 1500 charge/discharge cycles. As a result, photovoltaic powered air-conditioners and refrigerators have thus far proven to be impractical for residential and commercial use.

The reversed Stirling cycle engines are directly driven by the kinetic energy derived from a hybrid solar/wind power source having a wind turbine and solar Stirling engines. As a result, they are much more efficient than the photovoltaic powered Stirling heat pump/cooler (Free Piston Stirling Engines-FPSE or kinematic Stirling engines). The photovoltaic powered Stirling heat pump/cooler loses energy each time energy is converted from one form to another, and also requires frequent deeply draining and recharging a large battery bank. The frequent on/off power surge and loss also decrease the efficiency of the photovoltaic powered and electric motor driven Stirling heat pump/cooler.

An additional advantage to having a direct drive between the hybrid solar/wind power source and the system is that energy storage and conversion become unnecessary. This eliminates a major source of inefficiency. As a result, the direct driven reversed Stirling cycle engines are useful for making air-conditioning/refrigeration, space-heating and electricity generation systems more efficient in operation, more lightweight in construction, more compact for installation, and less expensive to own.

The system disclosed herein also has no excess heat problem because once the desired temperature is reached, the solar and wind hybrid energy is converted to electricity. This avoids generating heat, unlike a fuel-fired micro Combined Heat and Power (CHP) unit.

Micro Combined Heat and Power (CHP) systems, which operate in homes or small commercial buildings, are driven by heat-demand and deliver electricity as the byproduct. Because of this operating model, and because when the heat is not needed, for example in warm weather or in warm and hot areas, the cold zone heat dissipation of Stirling engines from electricity generation becomes waste heat.

In some applications, a solar/wind hybrid powered air-conditioning/refrigeration, space-heating and electricity generation system as described herein has better performance than the solar powered FPSE and free piston Stirling engine driven heat pump (FPSHP) which are designed to only convert solar energy during sunny daylight hours. They do not produce significant amount of energy during cloudy days and no energy outputs in the nighttime. Further, these complicated, expensive and hermetically sealed free piston Stirling engines can't carry out all of air-conditioning/refrigeration and space-heating and hot water supply and electricity generation in comparison with the solar/wind hybrid powered Stirling heat pump and cooler system disclosed herein.

Also, in other applications, the wind powered conventional kinematic type Stirling heat pump/cooler and wind powered/electric motor driven Stirling heat pump/cooler suffers insufficient amount of energy production from wind turbine and conversion loss, especially for urban and suburban areas.

A reversed Stirling cycle air-conditioning/refrigeration system provides a promising alternative to conventional Freon based compressor heat pump systems and renewable energy solutions (e.g., solar and wind powered) is a thriving alternative to prime movers use non-renewable fossil energy (e.g., electric powered or fuel-fired).

A typical reversed Stirling cycle engine includes a power piston and displacer piston in a cylinder, and a drive mechanism including a power source, a crankshaft, a flywheel, a connecting rod connecting the crankshaft to each piston, a regenerator, and a crankcase housing. The drive mechanism converts the rotary motion of a power source, via a crankshaft, to reciprocating motion of the two pistons with a 90 degrees phase angle there between. The unit uses either air, pressurized helium, or other gases as the working fluid. The out-of-phase motion of the two pistons allows the gas to be compressed, expanded, and moved back and forth within the cylinders without the need for valves, and develops sufficient pressure change to continue the motion.

For the solar/wind hybrid powered stacked Stirling heat pump and cooler, the forced air passes sequentially through the plurality of heat exchangers of hot zones or cold zones of the plurality of cylinders for heating or cooling. The plurality of heat exchangers are united in a unit and disposed in insulated enclosures. Therefore, the stacked reversed Stirling engines, as compared with a single large reversed Stirling engine provided with a single large cylinder, is able to recover the heat or cold generated by the kinetic energy input derived from the hybrid solar/wind power source at a high recovery ratio to increase the heat transfer services (e.g., space-heating and cooling, and refrigeration) output. Consequently, the thickness of the stacked reversed Stirling engines can be reduced, and the space between adjacent cylinders can also be reduced, thus reducing the overall size of the stacked reversed Stirling engines.

The modular design of the multiple reversed Stirling engines and Stirling engines make it possible to share components and parts. Besides reduction in cost (due to lesser customization, and less learning time), and flexibility in design, modularity offers other benefits such as augmentation (adding new solution by merely plugging in a new module), and exclusion. The modular systems are also interchangeable and expandable that enables the hybrid system to operate more efficiently and to increase capacity easily and to be manufactured and maintained at low cost.

According to one embodiment, the plurality of cylinders are disposed parallel to each other. The flywheels connected to the respective displacer pistons and power pistons of the plurality of cylinders are affixed to a common kinetic energy input drive shaft. Further, the stacked reversed Stirling engines may have an engine case and the case for sealing the single input drive shaft, and the generator may be a part of the engine case while keeping each cylinder airtight with an air bearing provided between each cylinder and each piston. Thus component members can be simplified and the number of component members can be reduced.

Although a larger Stirling engine produce more energy than a small Stirling engine, the efficiency of the engine, however, can decrease as the size increases. Because the Stirling engine is based on kinetic movement of pistons within a chamber the size of the piston can reduce energy out put per unit of thermal input if it is too large. So the efficiency of the tandem, stacked, or multistage reversed Stirling cycle engines can be considerable as a result of its dependence on integrated, simplified, miniaturized mechanisms, self contained and the sharing of insulated enclosures. This is in part because a single input decreases the power loss and maximizes the power usage. Further, The engines can be operated at high pressures. Thus, in most high power Stirling engines, both the minimum pressure and mean pressure of the working fluid are above atmospheric pressure.

The advantages of the tandem, stacked or multistage layouts of the reversed Stirling engines are equally true when applied to the solar powered Stirling engines of the solar/wind hybrid subsystem. Further, both the Stirling engine and reversed Stirling cycle engine runs at a constant speed, which has many advantages, the first being less wear, the second being better efficiency.

The system can be used for domestic, small commercial uses, especially in the urban and suburban area. In some implementations, the system includes a hybrid solar/wind power source, a set of multiple stacked reversed Stirling cycle engines, two insulated heat exchanger enclosures, an electrical generator, a circulation fan, a fresh air intake fan, a wind funnel/chutes, engage-disengage mechanisms, and insulated air ducts etc. The whole system can be mounted in vertical, horizontal, or other aligned operational positions and fit inside of an attic, on a rooftop or on a stand-alone pole. At first, a set of engage-disengage mechanisms are set up to transfer mechanical power directly to the drive shaft of the multiple stacked reversed Stirling cycle engines and circulation fan by the injection of kinetic energy from the hybrid solar/wind power source. The reversed Stirling cycle engines convert input mechanical energy to extract heat from its target volume. The circulation fan, affixed to the same drive shaft of the reversed Stirling cycle engines, circulates air through the insulated enclosures of the heat exchanger of the reversed Stirling cycle engines to the building and back. The forced air circulation and air-to-air heat exchanging makes the system simple and less prone to noise and vibration.

For instance, as a result of the innate synergy between the various assemblies in this air-conditioning/refrigeration, space-heating and electricity generation with solar/wind hybrid energy converting system, the cooled air and heat output is generated by the same reversed Stirling cycle engines in a much more efficient way than any of these components alone (e.g., Stirling cooler, Stirling heat pump, wind turbine, solar Stirling engines, solar collector, battery bank, electrical generator etc.). Also, the solar/wind hybrid powered reversed Stirling cycle engines system can provide cooled air or heat or complementary electricity throughout day and night as an integrated, direct driven and self contained unit. This reduces the cost of electricity generation and the need for high volume battery packs that can be both expensive and undependable.

The integrated and flexible design of the system requires neither sophisticated electronic devices nor a high degree of precision in manufacturing. Since materials of high thermal tolerance are not necessarily required for the majority of the design, this structure-balanced, self contained system can use largely high-strength, non-corrosive, shock-absorbent, vibration-dampening, and lightweight advanced composites (e.g., glass fiber, carbon fiber and Kevlar fiber) to reduce weight and noise and to maintain high operational efficiencies and low maintenance costs. For instance, the system may use compression molding solar collectors (e.g., parabolic dish and trough etc.), insulated enclosure, pulley, drain pan and filament wound drive shaft, supporting tube, air duct and sheet laminated wind rotor, windshield, deflector, circulation fan, airway shutoff door and pultruded drain line, hatch door, rod, beam, panel etc.

In some examples, the multiple reversed Stirling cycle engines can be equipped with a heat exchanger that surrounds the cold zone and the hot zone with a forced air and fin system. The reversed Stirling cycle engines cold zone and hot zone heat exchanger insulated enclosure housings are respectively connected to the specific inbound insulated air duct and outbound insulated air duct that runs into the housing of a circulation fan. The heat sinks undergo suction from the spinning rotors of the wind turbine, thus assuring constant airflow for heat convection. The constant movement of air enhances heat dissipation/heat absorption and provides better performance than un-blown heat sinks. In addition, the constant suction of airflow keeps hot zone temperatures lower when the Stirling engine operates as a cooler and supplies more heat to the heat absorption end (cold zone) when the Stirling engine operates in heat pump mode. A forced air rejection system includes peripheral metal fins around the cold zone and hot zone and wind turbine rotors to force air through the airways of wind funnel/chutes and into the environment.

One example of an air circulation mechanism includes a thermostat, thermocouples, two insulated enclosures (cold zone and hot zone), two fan housings (circulation fan and fresh air intake fan), pulleys/V-belt mechanisms, and insulated air ducts etc. The cold zone and hot zone insulated enclosures have manual or automated control of hatch doors and open/shut-off common valve mechanisms of the insulated air ducts.

In some implementations, the opening/closing mechanisms (automated controlled or manually operated hatch doors) of the cold zone and hot zone insulated enclosures, are controlled by the same thermostat and control module. The thermostat also controls the open/shut-off common valve mechanisms of the insulated air ducts.

In air-conditioning mode, when the indoor thermostat exceeds a set temperature (e.g., 75 degrees Fahrenheit), the thermostat activates the engage/disengage electric motor to engage the solar/wind hybrid kinetic energy drive shaft with the reversed Stirling engines and the circulation fan to circulate indoor warm air through the closed insulated enclosure of the cold zone of the multiple reversed Stirling cycle engines (which function as Stirling coolers) with the hot zone insulated enclosure's hatch doors opened and the insulated air duct's dual acting common valves closed. The cooled air keeps transporting cold from the cold zone of the multiple Stirling coolers by the circulating fan into the building. Once the indoor temperature falls below a set temperature (e.g., 70 degrees Fahrenheit), the reversed Stirling cycle engines are disengaged from the rotating drive shaft of the hybrid solar/wind power source first then the electrical generator engages with the drive shaft of the hybrid solar/wind power source subsequently.

In refrigeration mode, when the refrigerator thermostat exceeds a set temperature (e.g., 32 degrees Fahrenheit), the thermostat activates the engage/disengage electric motor to engage the solar/wind hybrid kinetic energy drive shaft with the reversed Stirling engines and the circulation fan to circulate cooled air inside the refrigerator radiator through the closed insulated enclosure of the cold zone of the multiple reversed Stirling cycle engines (function as Stirling refrigerators) with the hot zone insulated enclosure's hatch doors opened and the insulated air duct's dual acting common valves closed. The forced air keeps transporting the cold from the cold zone of the multiple Stirling refrigerators by the circulating fan into the refrigerator radiator. Once the refrigerator temperature falls below a set temperature (e.g., 20 degrees Fahrenheit), the reversed Stirling cycle engines are disengaged from the rotating drive shaft of the hybrid solar/wind power source first then the electrical generator engages with the drive shaft of the hybrid solar/wind power source subsequently.

When the air is forced by circulation fan through radiator-type heat sink (such as a metal device with many fins in thermal communication therewith) that covers the cold zone. The thermal energy from the air is transferred to the cold zone (heat absorption end) by moving air between the fins so that the efficient heat absorption is promptly obtained. By attaching external heat exchangers to the hot zone of the reversed Stirling engines and opening the hatch doors of the hot zone insulated enclosure, heat can be removed by the suction airflow of the spinning rotors of the wind turbine and forced heat convection to the environment. The cooled air then is forced through an insulated air duct into the building or refrigerator radiator.

In space-heating mode, when the indoor thermostat falls below a set temperature (e.g., 65 degrees Fahrenheit), the thermostat activates the engage/disengage electric motor to engage the solar/wind hybrid kinetic energy drive shaft with the reversed Stirling engines and the circulation fan to circulate indoor cold air through the closed insulated enclosure of the hot zone of the multiple reversed Stirling cycle engines (functioning as Stirling heat pumps) with the cold zone insulated enclosure's hatch doors opened and the insulated air duct's dual acting common valves closed. The heated air keeps transporting the heat from the hot zone of the multiple Stirling heat pumps by the circulating fan into the building. Once the indoor temperature exceeds a higher set temperature (e.g., 70 degrees Fahrenheit), the reversed Stirling cycle engines are disengaged from the rotating drive shaft of the hybrid solar/wind power source first then the electrical generator engages with the drive shaft of the hybrid solar/wind power source subsequently.

When the cold air inside the building is forced by a circulation fan through a radiator-type heat sink (such as a metal device with many fins in thermal communication therewith) that covers the hot zone, the thermal energy from the hot zone is transferred to the cold air by moving cold air between the fins. This promotes efficient heat exchange. By attaching external heat exchangers to the cold zone of the reversed Stirling engines and opening the hatch doors of the cold zone insulated enclosure, ice and frost deposited on the heat exchanger can be removed and discharged into the environment by suction airflow caused by the spinning rotors of the wind turbine. The heated air then is forced through an insulated air duct into the building.

In some examples, the radiator-type heat exchanger (for example, a metal device with many fins in thermal contact therewith for radiating heat) that surrounds the return cooling water supply line to the cold zone of the Stirling engines (in the solar and wind hybrid power subsystem) can also be cooled down by the same suction force caused by the spinning rotors of the wind turbine. This improves the transfer of thermal energy from the radiator-type heat exchanger by moving warm air out of the fins, thus promoting efficient heat dissipation and greatly enhancing the efficiency of the solar Stirling engines.

In some implementations, when the wind turbine is in its vertically aligned operational position, a first engage/disengage mechanism is provided for mechanically engaging and disengaging drive shafts of the hybrid solar/wind power source and the reversed Stirling cycle engines with sets of pulleys and V-belts. A rubber V-shaped driving belt transfers driving force from the drive shaft of the hybrid solar/wind power source to the drive shaft of the reversed Stirling cycle engines. The engage/disengage mechanisms cause the third pulley to selectively form a triangle with two other pulleys. A small engage/disengage electric motor can be activated by the control module in response to a temperature measurement made by a thermostat or temperature sensor.

When in air-conditioning mode, a small engage/disengage electric motor extends/tightens (i.e. engages) the V-shaped driving belt once the temperature rises to a first set temperature (e.g., 75 degrees Fahrenheit) to drive the reversed Stirling cycle engines (i.e. when the engine functions as a Stirling cooler) into oscillation. When the temperature falls to a second set temperature (e.g., 70 degrees Fahrenheit), i.e. when the room is cool enough, the small engage/disengage electric motor retracts/loosens (i.e. disengages) the V-shaped driving belt. All three pulleys have large flanges to hold the V-shaped belt in the grooves when the belt is slack (disengaged).

When in refrigeration mode, a small engage/disengage electric motor extends/tightens (i.e. engages) the V-shaped driving belt once the temperature rises to a first set temperature (e.g., 32 degrees Fahrenheit) to drive the reversed Stirling cycle engines (which function as a Stirling refrigerator) into oscillation. When the temperature falls to a second set temperature (e.g., 20 degrees Fahrenheit), i.e. when the refrigerator is cold enough, the small engage/disengage electric motor retracts/loosens (i.e. disengages) the V-shaped driving belt. All three pulleys have large flanges to hold the V-shaped belt in the grooves when the belt is slack (disengaged).

When in space-heating mode, the same small engage/disengage electric motor extends/tightens (i.e. engages) the V-shaped driving belt when the temperature falls to the first set temperature (e.g., 65 degrees Fahrenheit). This drives the reversed Stirling cycle engines (function as a Stirling heat pump) into oscillation. When the temperature rises to a second set temperature (e.g., 70 degrees Fahrenheit), i.e. when the room is warm enough, the small engage/disengage electric motor retracts/loosens (i.e. disengages) the V-shaped driving belt. All three pulleys have large flanges to hold the V-shaped belt in the grooves when the belt is slack (disengaged).

A second engage/disengage mechanism is provided for coupling the driving shafts of the hybrid solar/wind power source and an electrical generator. This mechanism also uses sets of pulleys and V-belts. A rubber V-shaped driving belt transfers driving force from the driving shafts of the hybrid solar/wind power source to the electrical generator. The second engage/disengage mechanism also has a third pulley that selectively forms a triangle with two other pulleys. A small engage/disengage electric motor is activated by the control module in response to a temperature measurement made by a thermostat or temperature sensor.

The hybrid solar/wind kinetic energy drive shaft is either engaged to the drive shaft of the reversed Stirling cycle engines or engaged to the other drive shaft of the electrical generator to fully utilize the renewable energy derived from the sun and wind. All three pulleys also have large flanges to hold the V-shaped belt in the grooves when the belt is slack (disengaged).

A third engage/disengage mechanism is provided for coupling the electrical generator and the fresh air intake fan. This mechanism also uses sets of pulleys and V-belts. A rubber V-shaped driving belt transfers driving force from the driving shafts of the hybrid solar/wind power source to the electrical generator and to the fresh air intake fan. The third engage/disengage mechanism also has the third pulley that selectively forms a triangle with two other pulleys. A small engage/disengage electric motor is activated by the control module in response to a temperature measurement made by a thermostat or sensor.

When the reversed Stirling cycle engines (coolers or heat pumps) are disengaged from the drive shaft of the hybrid solar/wind power source, the third engage/disengage mechanism engages the fresh air intake fan and the electrical generator to bring in the fresh air from outside, or disengages the fresh air intake fan from the electrical generator if outside air is not needed. The mechanism can be controlled manually, by fresh air intake switches (e.g., fan-on or fan-off switches) or automatically, by the thermostat and/or control module. All three pulleys also have large flanges to hold the V-shaped belt in the grooves when the belt is slack (disengaged).

In some implementations, when the wind turbine is oriented in its horizontally aligned operational position, electromagnetic clutches might be used as engage/disengage mechanisms. These clutches are likewise controlled by the control module in response to a temperature measurement made by a thermostat or sensor.

In response to environmental conditions, for instance, rain condition, snow condition, and hail condition, the system can include drain holes, a drain pan and drain lines to drain water falling in rain, snow, hail, or ice form. On rainy days, the drain drops can be collected in a drain pan and drained out the building. On snowy days, the melted snow can also be collected in a drain pan and drained out the building. As such, this hybrid solar/wind powered air-conditioning/refrigeration, space-heating and electricity generation system works in almost any environment condition.

In some implementations, the reversed Stirling cycle engines may be located beneath or beside a power source to avoid obstructing the wind rotors direct access to the prevailing wind. Because the systems use modular design and are structurally balanced, it would also be easy to scale up the system by adding more Stirling engines, reversed Stirling cycle engines, or wind turbines, or by enlarging the solar collector and/or wind turbine.

Systems as described herein can be located at sites such as rooftops, or they can stand alone in a backyard or a parking lot. In either case, the systems described herein are suitable for both residential and commercial uses, especially in urban and suburban areas.

In another aspect, the invention features a system for converting solar and wind hybrid energy for use with a stack of reversed thermo-mechanical engines for at least one of air-conditioning/refrigeration, space-heating, hot water supply and electricity generation. Such a system includes a wind and solar hybrid powered subsystem, a stacked reversed thermo-mechanical engine subsystem, a third shaft coupled to an electrical generator; and a fourth shaft coupled to a fresh air intake rotary fan.

The wind and solar hybrid powered subsystem includes a solar collector for receiving solar energy to generate thermal energy; stacked thermo-mechanical engines coupled to the solar collector for converting the generated thermal energy into mechanical energy; a rotor mounted for rotation in response to wind incident thereon; and a first shaft mechanically coupled between the rotor and the thermo-mechanical engines.

The stacked reversed thermo-mechanical engine subsystem includes stacked reversed thermo-mechanical engines and a second shaft mechanically coupled to the first shaft of the wind and solar hybrid powered subsystem for converting the mechanical energy generated by the wind and solar hybrid powered subsystem into energy for controlling temperature in a space whose temperature is to be controlled. This energy is used for air-conditioning, refrigeration, and/or space-heating. The system also includes a circulation fan that is mechanically coupled to the same second shaft of the stacked reversed thermo-mechanical engines.

The system further includes an interconnection subsystem configured for disengageably coupling a pair of shafts. The pair of shafts can be the first shaft and the second shaft, in which case mechanical energy from the wind and solar hybrid powered subsystem is transferred to the stacked reversed thermo-mechanical engines subsystem. Or the pair of shafts can be the first shaft and the third shaft, in which case mechanical energy generated by the wind and solar hybrid powered subsystem is transferred to the electrical generator. Or the pair of shafts can be the third shaft and the fourth shaft, in which case mechanical energy is coupled between the electrical generator and the fresh air intake rotary fan.

Embodiments of the system include those in which the reversed thermo-mechanical engine subsystem includes at least one Stirling cycle heat pump/cooler.

Other embodiments of the system include those further including a wind funnel structure mounted beneath the rotor. These embodiments include those in which the wind funnel structure includes a set of one or more air chute members symmetrically positioned under the rotor. These air chute members are aligned to direct air in a direction for urging the rotor to rotate in response to wind incident thereon. The wind funnel structure and air chute members can further include optional controlled airway shutoff mechanisms.

The wind funnel structure can further include a drainage subsystem for draining precipitation falling through the wind chutes. Such a drainage subsystem includes a set of drain holes, a drain pan positioned to receive falling rain, sleet, snow or hail from the openings of wind chutes and airway, and drain lines for draining the drain pan.

Yet other embodiments include a fixed windshield structure having an arcuate-cylindrical member positioned outside a periphery of the rotor for blocking wind flow to the backside of the rotors, therefore preventing the wind from inhibiting the rotation of the rotors. Among these are embodiments that also include a deflector angle-mounted at the outer edge of the rotor for deflecting wind in a direction to urge rotation of the rotor.

Additional embodiments include a second wind shield/deflector configured to be mounted on a roof that is adjacent to the rotor for directing wind flow toward a desired region of the rotor in a direction selected to urge rotation of the rotor.

The interconnection subsystem can include a set of pulleys and one or more V-belts. These V-belts selectively couple to the set of pulleys. The interconnection subsystem can also include one or more electric motors configured for moving selected pulleys upon activation by a control signal. This movement results in tightening the V-belts over the set of pulleys, thereby causing one shaft to couple to another shaft.

Alternatively or in addition, the system can include sets of electromagnetic clutches. Among these are embodiments that also include a control module for generating a control signal for activating the electromagnetic clutches in response to environmental and system conditions.

In either case, the system can include a control module for generating a control signal for activating either the electric motor or the electromagnetic clutches in response to changes in environmental and system conditions. The environmental and system conditions can include a wind condition, a sun condition and a temperature condition, or any combination thereof. In some embodiments, the control module also includes anemometer, one or more temperature sensors and thermostats.

The reversed thermo-mechanical engines can also include walls defining a hot-zone insulated enclosure and walls defining a cold-zone insulated enclosure. In such cases, there can be air hatch doors and air duct common valves for enabling air to pass into or out of the enclosures in response to activation of a control signal, as well as a control module for generating the control signal for activating the air hatch doors and air duct common valves in response to environmental and system conditions.

Additional embodiments of the system also include those having an air circulation system for circulating air between the insulated enclosures of the stacked reversed thermo mechanical engines and a space in which temperature is to be controlled.

In another aspect, the invention features a system for environmental control. Such a system includes: a hybrid wind and solar energy collection subsystem; a temperature control subsystem; an electrical generating subsystem; a sensor for detecting an environmental condition; and a controller. The controller receives information representing an environmental condition from the sensor, and is programmed to detect a change in an environmental condition. In response to the change, the controller selectively connects the hybrid wind and solar energy collection subsystem to either the temperature control subsystem or the electrical generating subsystem. It also selectively disconnects the hybrid wind and solar energy collection subsystem from the remaining subsystem.

Other features and advantages of the system are apparent from the following description, and from the claims.

DESCRIPTION OF DRAWINGS

FIG. 1 is a block diagram of a system that carries out air-conditioning/refrigeration, space-heating and/or electricity generation using kinetic energy from solar and/or wind depending on environmental conditions.

FIGS. 2A and 2B are schematic diagrams of embodiments of the system of FIG. 1 configured in a vertically aligned operational position and in air-conditioning/refrigeration mode and space-heating mode respectively.

FIG. 3 is a schematic diagram of the system shown in FIG. 1 in a horizontally aligned operational position showing electromagnetic clutches.

FIG. 6A is a schematic diagram of an embodiment of the cold side heat exchanger insulated enclosure with the hatch doors closed and the hot side heat exchanger insulated enclosure with the hatch doors opened and the insulated air duct's dual acting common valves are opened to cold zone and closed to hot zone when the system in air-conditioning/refrigeration mode (Stirling coolers/refrigerators).

FIG. 6B is a schematic diagram of an embodiment of the hot side heat exchanger insulated enclosure with the hatch doors closed and the cold side heat exchanger insulated enclosure with the hatch doors opened and the insulated air duct's dual acting common valves are opened to hot zone and closed to cold zone when the system in space-heating mode (Stirling heat pumps).

FIG. 7 illustrates a wind funnel and accompanying chutes that can be coupled to bottom of a vertically aligned wind turbine. It also shows the interaction of wind flow directions in accordance with windshield-deflector alignment.

FIGS. 8B and 8C illustrate closing and opening mechanisms of wind chutes/airway in both a vertically oriented wind turbine and a horizontally oriented wind turbine of the type shown in FIG. 1.

FIG. 9 illustrates wind chutes/airway openings, drain holes, a drain pan, a drain line and a wind funnel structure to be deployed in the system shown in FIG. 1.

FIG. 10 illustrates the interaction of attic hot air flow with wind chutes and rotors in a horizontally aligned Savonius rotor type wind turbine.

FIG. 14A shows a top view of engagement between the drive shaft of the hybrid solar/wind kinetic power supply and the reversed Stirling cycle engines and disengagement of others.

FIG. 14B shows a top view of engagement between the drive shaft of the hybrid solar/wind kinetic power supply and the electrical generator and disengagement of others.

FIG. 14C shows a top view of engagement between the drive shaft of the hybrid solar/wind kinetic power supply, the electrical generator and fresh air intake fan and disengagement of others.

FIG. 15B illustrates the side and top views of engage/disengage couplings with different rpm of pulleys as a result of predetermined different pulley diameter ratios of the hybrid solar/wind power source, reversed Stirling cycle engines, electrical generator and fresh air intake fan.

FIG. 16 is a schematic diagram of a further embodiment of the refrigeration mode (Stirling refrigerators) and electricity generation system of FIG. 1 that is coupled with cooler, refrigerator and freezer that is used in store, supermarket, office and house.

DETAILED DESCRIPTION

Figure 2B:
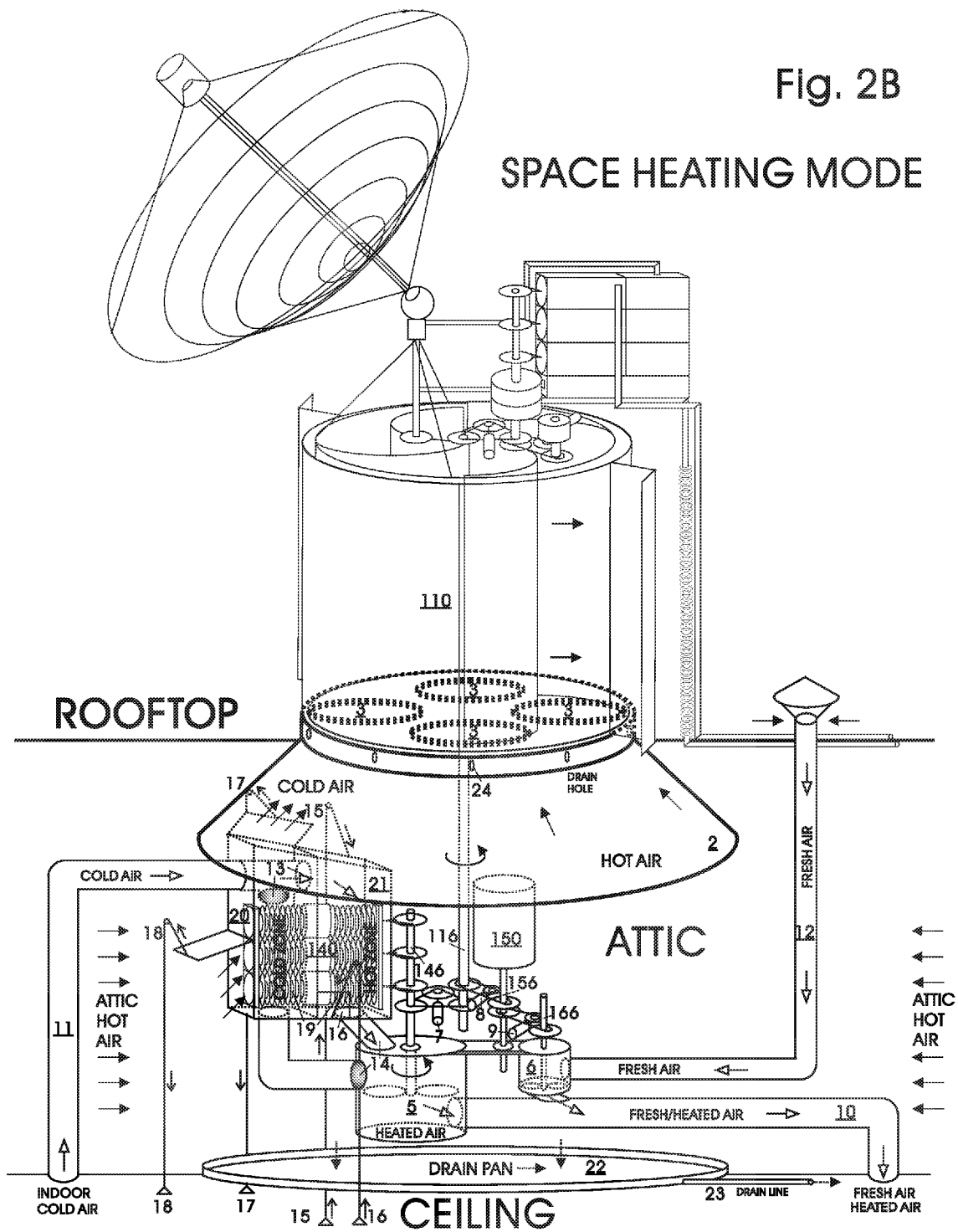

Referring to FIG. 1, a system 100 that integrates a solar/wind hybrid powered reversed Stirling cycle engine (i.e. Stirling cooler/heat pump) and an electricity generation system is configured for air-conditioning/refrigeration, space-heating and electricity generation from both solar and wind energy sources.

The system 100 includes a hybrid solar/wind power source subsystem 110 (hereafter referred to as "solar/wind subsystem 110") to generate mechanical energy, and a mechanical transmission mechanism 112 (e.g., a set of gears and/or shafts) for transmitting the generated mechanical energy to a main shaft 116 of the solar/wind subsystem 110, thus driving either a set of reversed Stirling cycle engines 140 or an electrical generator 150.

Depending on the particular applications, the electrical generator 150 can be a synchronized generator or an asynchronized generator. The electricity output by the generator can be used by a load 152 (e.g., home appliances), stored in a storage unit 153 (e.g., a set of batteries), or provided to an electrical grid 154.

The system 100 also includes refrigeration 142, air-conditioning 143 and space-heating 144 subsystems having stacked reversed Stirling cycle engines 140 (e.g., Stirling cycle heat pumps and coolers) for harnessing kinetic energy for air-conditioning, refrigeration, or space-heating.

An interconnection subsystem 141 utilizes the energy generated by the solar/wind subsystem 110 by disengageably coupling the main drive shaft 116 of the solar/wind subsystem 110 to a main drive shaft 146 of the reversed Stirling cycle engines 140. As a result, the mechanical energy derived respectively from wind and solar sources is combined together to power the reversed Stirling cycle engines 140 (e.g., Stirling cycle coolers and heat pumps).

To further utilize the energy generated by the solar/wind subsystem 110, an interconnection subsystem 151 is provided for disengageably coupling the main shaft 116 of the solar/wind subsystem 110 to a main drive shaft 156 of the electrical generator subsystem 150. As a result, the mechanical energy derived respectively from wind and solar sources is combined together to power the electrical generator 150.

An interconnection subsystem 161 brings in fresh air from outside when air-conditioning and space-heating are not operating. It does so by disengageably coupling a main drive shaft 166 of the fresh air intake fan 6 to the main drive shaft 156 of the electrical generator subsystem 150.

During the operation of the solar/wind subsystem 110, when main drive shaft 116 is coupled to the main drive shaft 146, the input to the stacked reversed Stirling cycle engines 140 is increased as a result of the superposition of the mechanical energy derived from solar and wind energy. When the system 100 is in air-conditioning mode and the room temperature is below 70 degrees Fahrenheit, the main drive shaft 116 of the solar/wind subsystem 110 is disengaged from the main drive shaft 146 and instead coupled to main drive shaft 156 of the electrical generator 150. This enables the system 100 to generate electricity when there is no need for air-conditioning, such as during nighttime, rainy, cloudy days and in mild weather. When the system 100 is in space-heating mode and the room temperature is above 70 degrees Fahrenheit, the main drive shaft 116 of the solar/wind subsystem 110 is disengaged from the main drive shaft 146 and instead coupled to the main drive shaft 156 of the electrical generator 150. This enables system 100 to generate electricity when there is no need for space-heating, such as during daytime, sunny days and in warm weather. As a result, the reversed Stirling cycle engines and electrical generator 140 and 150 operate in a complementary mode to dynamically utilize solar and wind energy in response to changing circumstances, thereby fully utilizing all available energy.

The following description includes discussions of various embodiments of the system 100 of FIG. 1 and mechanisms by which the system 100 can operate.

The system 100 of FIG. 1 can be mounted in a vertically aligned operating position, a horizontally aligned operating position, or in any other operational positions to fully utilize the environmental conditions of the location in which it is mounted. FIG. 2A shows one embodiment of the system 100 operating in air-conditioning/refrigeration mode and FIG. 2B shows one embodiment of the system 100 operating in space-heating mode. In both cases, the system is configured to operate in a vertically aligned operating position. The system 100 includes the solar/wind hybrid mechanical power subsystem 110, a set of stacked reversed Stirling cycle engines 140 (a type of thermo-mechanical engine), an electrical generator 150, a wind funnel 2, wind chutes 3, airway doors 4, a circulating fan 5, a fresh air intake fan 6, three engage/disengage electric motors 7, 8 and 9, an inbound insulated air duct 10, an outbound insulated air duct 11, a fresh air intake duct 12, dual acting common air valves 13, 14, air hatch controls 15, 16, 17, 18, a radiator-type heat exchanger 19, a cold zone insulated enclosure 20, a hot zone insulated enclosure 21, a drain pan 22, a drain line 23, and drain holes 24. Shaft 116 serves as the main drive shaft of the solar/wind subsystem 110, and main drive shaft 146 serves as the main drive shaft of the reversed Stirling cycle engines 140 and circulating fan 5. These two main drive shafts can be selectively coupled and decoupled by use of the engage/disengage electric motors 7 in response to changing environmental conditions. Similarly, main drive shafts 116 and 156 and main drive shafts 156, 166 can be selectively coupled and decoupled by use of corresponding engage/disengage electric motors 8, 9 as described in more detail below in connection with FIGS. 14A-C.

The solar/wind subsystem 110 uses solar and wind energies to apply a complementary force to power the multiple reversed Stirling cycle engines 140 (e.g., Stirling coolers and heat pumps) through main drive shaft 146, thereby converting kinetic power into needed cooling power as shown in FIG. 2A and heating power as shown in FIG. 2B. In the absence of any need for either air-conditioning/refrigeration or space-heating, the system 100 uses the wind power and the solar power for generating electricity using electrical generator 150.

The generator 150 is mechanically coupled by its main drive shaft 156 to the main drive shaft 116 of the solar/wind subsystem 110 to produce useful electrical output. If desired, the electricity generated by the generator 150 is stored in a storage device, such as battery banks 153, prior to being used by a consumer. As shown in FIGS. 2A, 2B, the whole system can be self-contained within a small space and footprint.

FIG. 3 illustrates another embodiment of the system 100, this time shown mounted in a horizontally aligned operational position. In this configuration, the engage/disengage mechanisms use electromagnetic clutches 91, 92 on both the electrical generator side and the reversed Stirling engine side. The alignment of the system on top of the pitched roof can increase the area available for catching wind to be directed onto wind turbine rotors. The deflected wind flow is along a direction that urges the rotors to rotate in a desired direction. This, in turn, results in greater power output.

Figure 4:
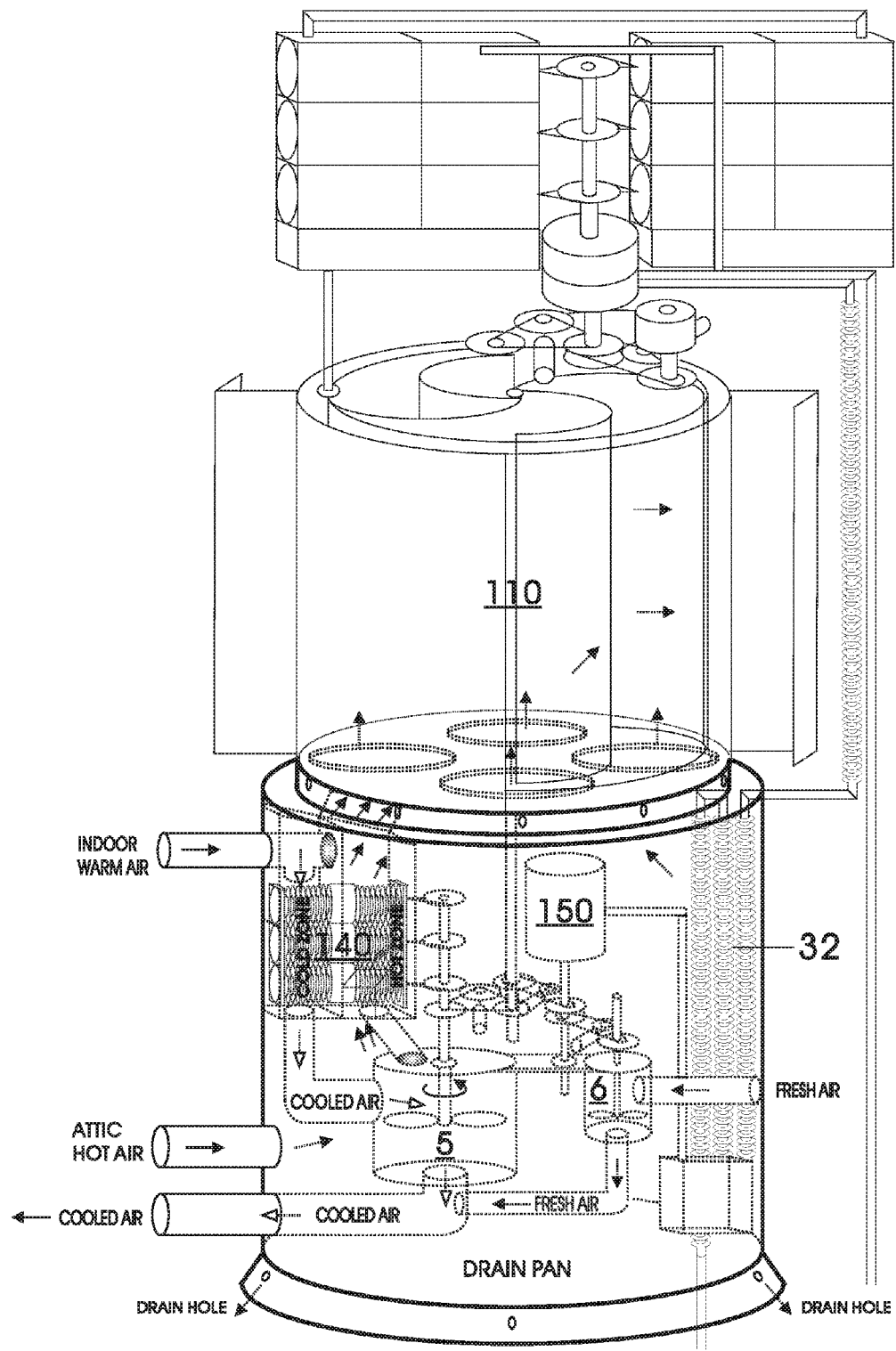
FIG. 4 is a schematic diagram of another embodiment of the system of FIG. 1 configured in an integrated and vertically aligned free standing operational position.

In some applications, the vertical alignment shown in FIG. 4 is adopted so that wind, regardless of its direction, can always rotate the wind turbine rotors without adjustment of the turbine axis and the main drive shaft 116. The whole system is integrated and self-contained. It can be installed either free standing on top of a pole or on a flat rooftop, and occupies only a small footprint.

A radiator-type heat sink 32 (e.g., a metal device with many fins) is provided along an upstream conduit that carries cooling water back to the water jacket of the cold zone of the solar Stirling engines of the solar/wind hybrid mechanical power subsystem 110. Hot water is a byproduct of the heat exchanging and cooling process of the solar thermal collection and conversion to mechanical energy of the subsystem 110. The suction caused by the spinning rotors of the wind turbine improves the transfer of thermal energy from the heat sink 32 to the air by moving cooler air between the fins. This greatly enhances the efficiency of the solar Stirling engines.

Figure 5A:
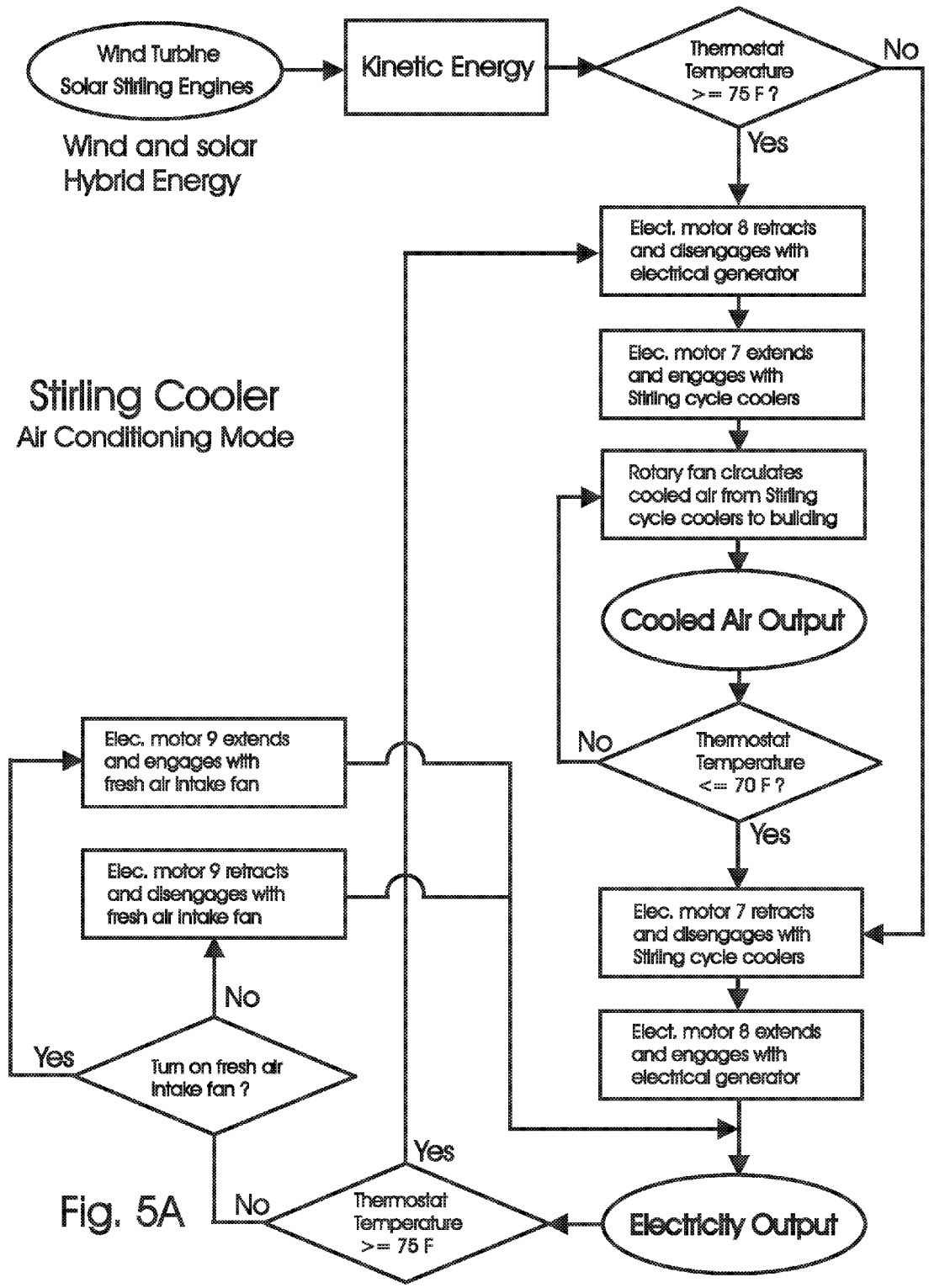
FIG. 5A is a flow diagram showing operation of the system in FIG. 1 in air-conditioning mode in which reversed Stirling engines are used as Stirling coolers.
Figure 5B:
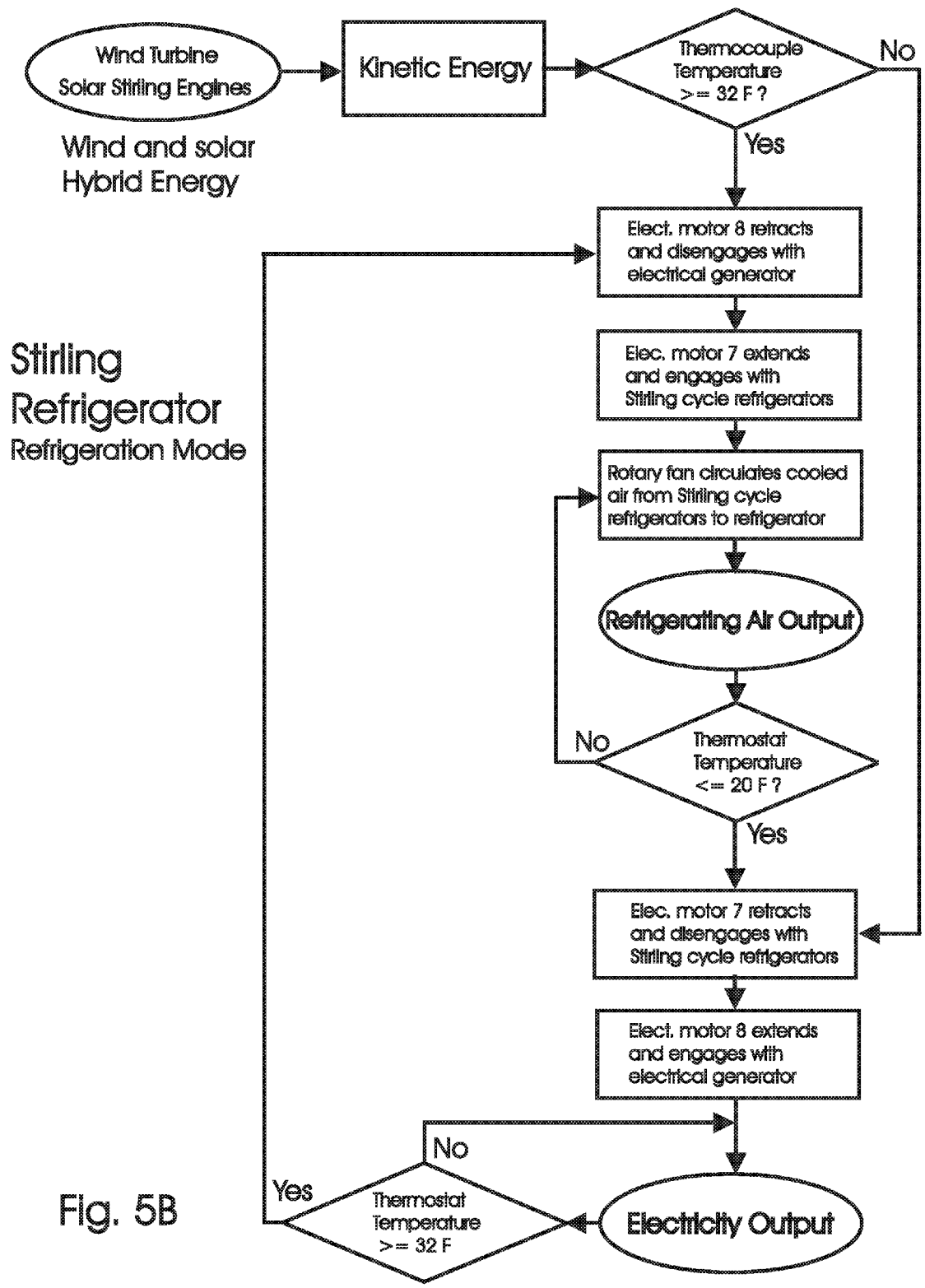
FIG. 5B is a flow diagram showing operation of the system in FIG. 1 in refrigeration mode in which reversed Stirling engines are used as Stirling refrigerators.
Figure 5C:
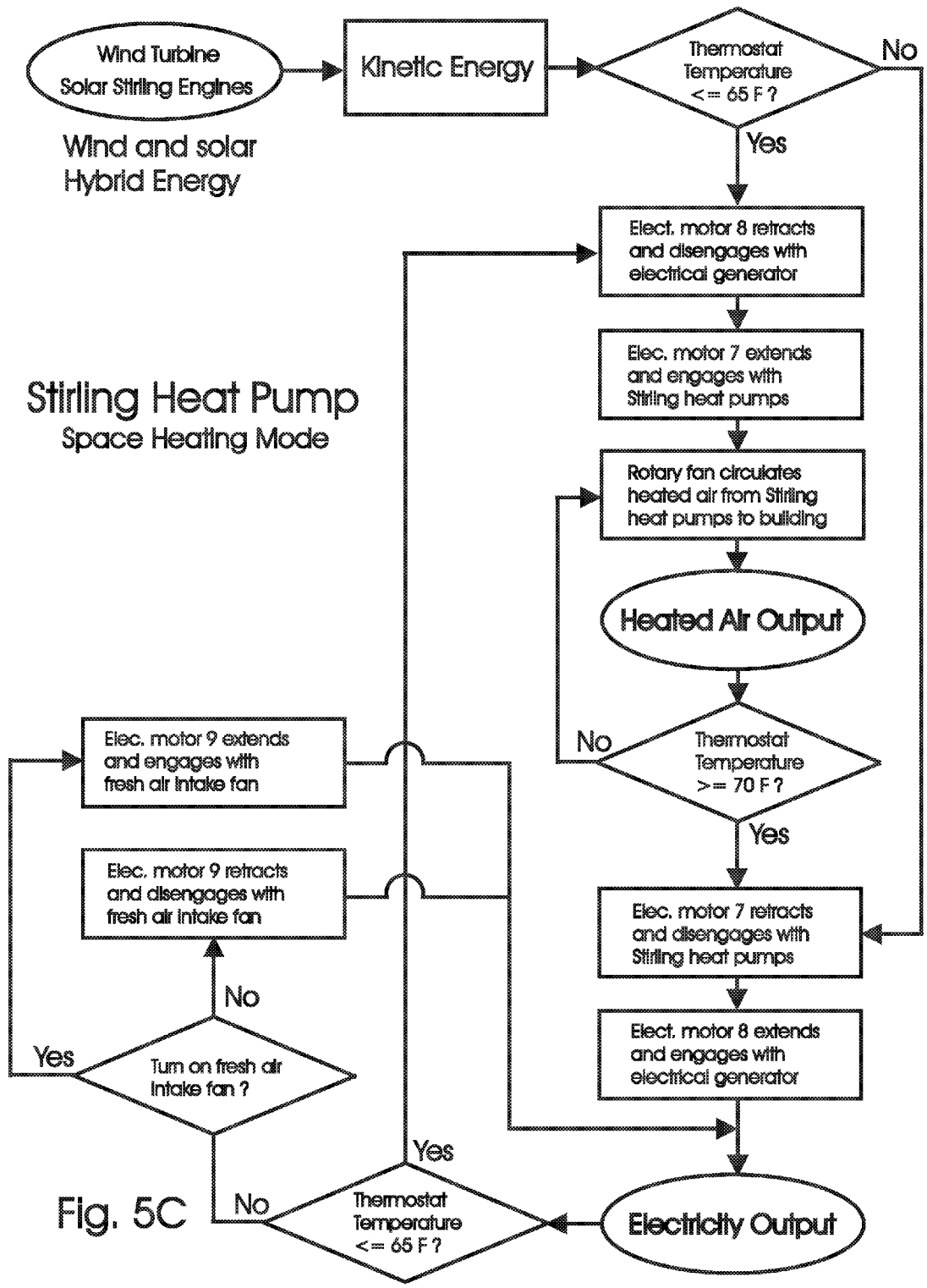
FIG. 5C is a flow diagram showing operation of the system of FIG. 1 in space-heating mode in which reversed Stirling engines are used as Stirling heat pumps.

FIGS. 5A-5C show flow diagrams of operational procedures used by the system 100 operating in air-conditioning mode, refrigeration mode, and space-heating mode respectively.

Figure 5D:
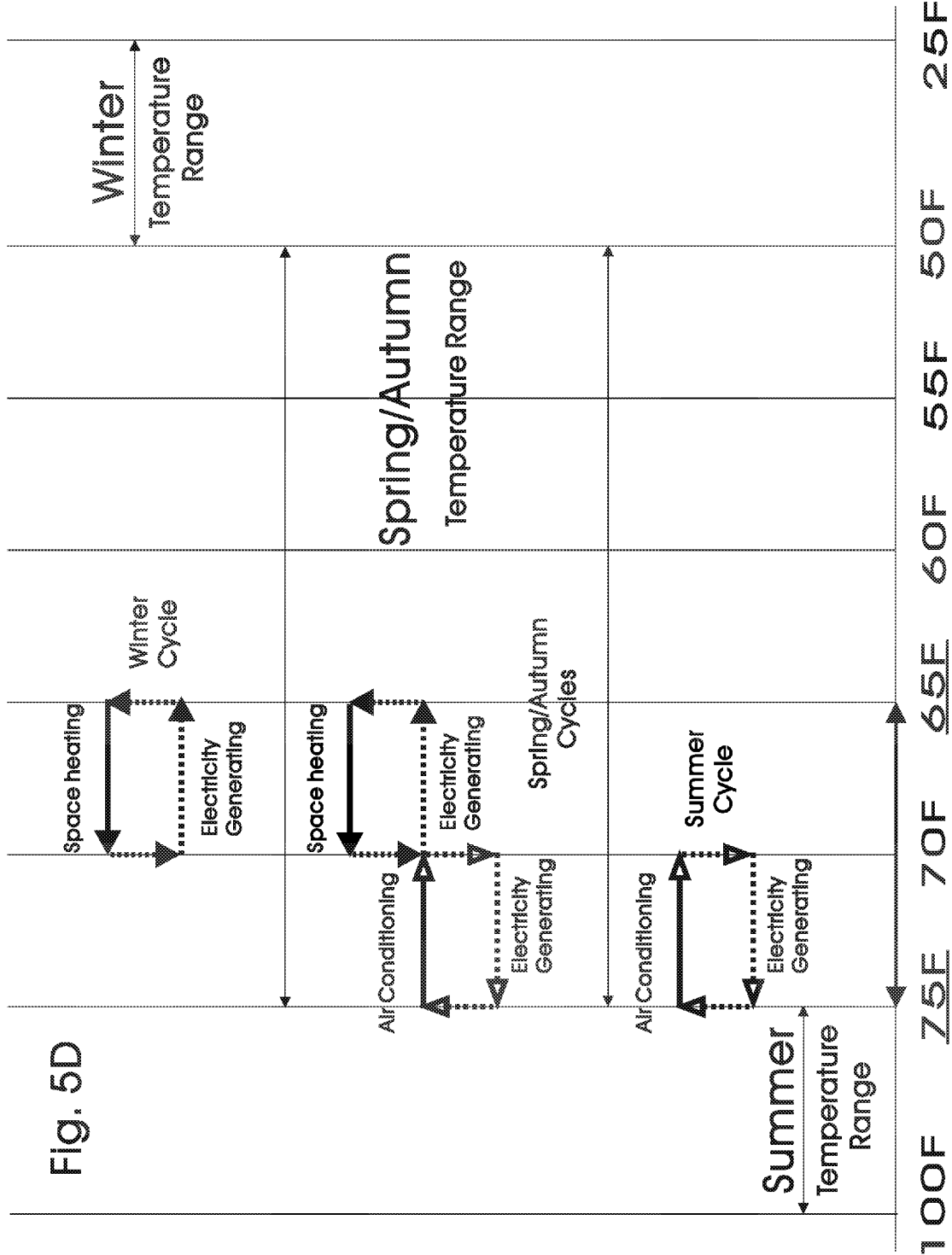
FIG. 5D shows a graph of temperature and seasonal cycle of the operations of the system of FIG. 1 in air-conditioning mode and space-heating mode, showing switching between air-conditioning/refrigeration mode and space-heating mode and a complementary electricity generation system.

FIG. 5D shows various seasonal cycles carried out by the system 100. According to these cycles, a control module causes the system 100 to cycle between either air-conditioning mode to electricity generation mode or space-heating mode to electricity generation mode in response to changing environmental conditions. When in air-conditioning mode, and the air is already cool enough so that actual air-conditioning is not necessary. As a result, the control module causes the system to generate electricity. Similarly, when the system 100 operates in space-heating mode and, the air is already warm enough, actual space-heating is not necessary. As a result, the control module causes the system 100 to generate electricity. Each seasonal cycle defined to keep ambient air temperature between 65 degrees Fahrenheit and 75 degrees Fahrenheit. This maintains a comfortable living environment and also permits the system 100 to generate electricity whenever it can do so without causing discomfort to occupants.

Referring to FIGS. 6A and 6B, in some embodiments, system 100 further includes individual insulated enclosures 20, 21 for the cold zone and hot zone respectively of the reversed Stirling cycle engines 140, with inbound insulated air duct 10 and outbound insulated air duct 11 connected.

When the system 100 operates in air-conditioning/refrigeration mode, and the indoor/refrigerator thermostat exceeds a set temperature (e.g., 75 degrees Fahrenheit for indoor/32 degrees Fahrenheit for refrigerator), the thermostat activates the engage/disengage electric motor 7 and engages the circulation fan 5 to circulate indoor warm air/refrigerator's radiator air through the closed insulated enclosure 20 of the cold zone of the multiple reversed Stirling cycle engines 140 (Stirling coolers/refrigerators) with the hot zone insulated enclosure hatch doors 15, 16 opened and cold zone side insulated air duct dual acting common valves 13, 14 opened (hot zone side and to the circulation fan opening are closed). The cooled air is then transported by the circulation fans 5 from the cold zone of the reversed Stirling cycle engines 140 (Stirling coolers/refrigerators) into the building/refrigerator's radiator as shown in FIG. 6A. Once the indoor/refrigerator temperature falls below a lower set temperature (e.g., 70 degrees Fahrenheit for indoor/20 degrees Fahrenheit for refrigerator), the reversed Stirling cycle engines 140 are disengaged from the rotating main drive shaft 116 of the hybrid solar/wind power source 110, after which the electricity generator 150 is engaged with the main drive shaft 116 of the hybrid solar/wind power source 110.

The warm air inside the building or the air inside the radiator of refrigerator is forced by circulation fan 5 through the radiator-type heat sink 19 (a metal device with many fins) that covers the cold zone. By attaching external heat exchangers 19 to the hot zone of the Stirling coolers/refrigerators and opening the hatch doors 15 and 16 of the hot zone insulated enclosure 21, heat can be removed using suction caused by the spinning rotors of the wind turbine. This causes heat to be discharged through wind chutes 3 and into the environment.

When the system 100 operates in space-heating mode, and the indoor thermostat falls below a set temperature (e.g., 65 degrees Fahrenheit), the thermostat activates the engage/disengage electric motor 8 to engage the circulation fan 5. This circulates indoor cold air through the closed insulated enclosure 21 of the hot zone of the multiple reversed Stirling cycle engines 140 (Stirling heat pumps) with the cold zone insulated enclosure hatch doors 17, 18 opened and insulated air duct dual acting common valves 13, 14 of the hot zone side opened (cold zone side and to the circulation fan opening are closed). The heated air is forced into the building by the circulation fan 5 as shown in FIG. 6B. Once the indoor temperature exceeds a set temperature (e.g., 70 degrees Fahrenheit), the reversed Stirling cycle engines 140 are disengaged from the rotating main drive shaft 116 of the hybrid solar/wind power source 110, after which the electricity generator 150 is engaged to the main drive shaft 116 of the hybrid solar/wind power source 110.

The circulation fan 5 forces cold air inside the building through a radiator-type heat sink 19 (metal device with many fins) that covers the hot zone. By attaching external heat exchangers 19 to the cold zone of the Stirling heat pumps and opening the hatch doors 17, 18 of the cold zone insulated enclosure 20, ice and frost deposited on the heat exchanger can be deiced and defrosted by suction airflow caused by the spinning rotors of the wind turbine, passed through the wind chutes 3, and discharged into the environment.

A wind funnel 2 and wind chutes 3 are disposed below the wind turbine, as shown in FIG. 7, when the system 100 is mounted in its vertically aligned operating position. FIG. 7 also shows the interaction of wind flow direction in accordance with windshield-deflector alignment of the vertical axis wind turbine of the hybrid solar/wind power source 110.

Figure 8A:
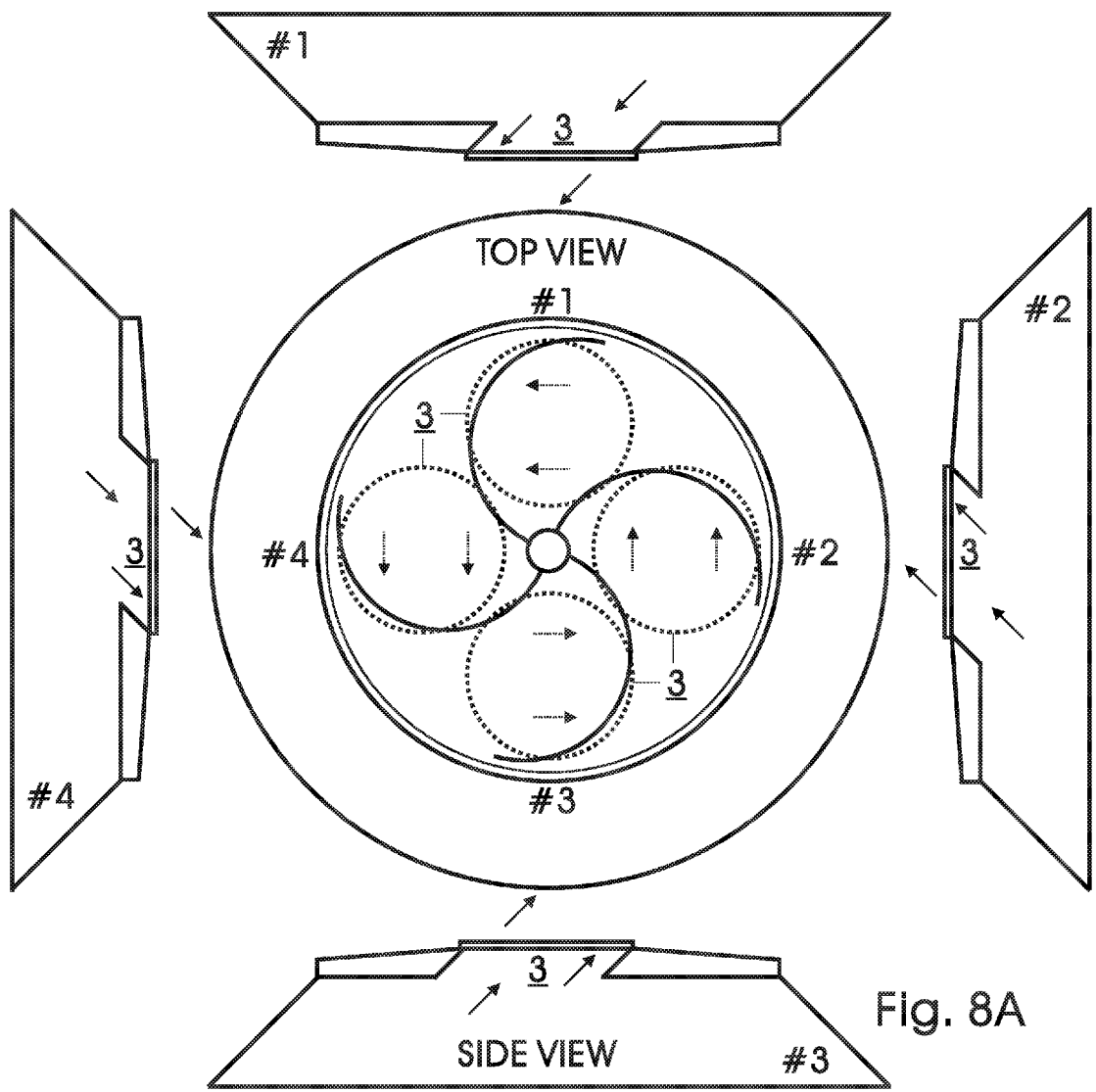
FIG. 8A illustrates four wind chutes inside the wind funnel and at the bottom of the wind turbine and configured to direct airflow in a direction aligned with the rotating direction of the rotors.

In some embodiments, wind chutes 3 with different airflow directions are mounted inside the wind funnel 2 for expelling hot air from attic, dissipating heat generated from the Stirling coolers, or removing the frost and ice deposited to the heat exchanger of the Stirling heat pumps. The wind chutes direct airflow toward desired regions of the wind turbine in a direction that tends to assist rotation of the rotors, as shown in FIG. 8A.

For summertime operation, opening the airway doors 4 of wind chutes 3 greatly enhances the efficiency of the Stirling coolers and the dissipation of heat from the attic. For wintertime operation, closing the airway doors 4 of wind chutes 3 greatly enhances the efficiency of the Stirling heat pumps and keeps the heat in the attic so that it can be absorbed by the reversed Stirling cycle engines 140 into the building, as shown in FIG. 8B and FIG. 8C.

The wind funnel/wind chute system is coupled to a drain pan 22, drain lines 23 and drain holes 24 to drain any water falling as in rain, snow, sleet or hail form. On days with precipitation, water can be collected in a drain pan 22 and drained out the building, as shown in FIG. 9.

Now referring to FIG. 10, a wind funnel structure expels hot air from the attic into the environment. The wind chutes direct airflow toward desired regions of the wind turbine. This airflow is aligned with the rotating direction of the rotors. In this example, two sets of windshield/deflector 41/42 are positioned opposite each other outside the periphery of the horizontal aligned wind turbine to direct the wind flow substantially towards only rotors or blades. The windshield/deflector 41/42 can also block wind flow to the backside of the rotors so that the wind is prevented from inhibiting the rotation of the rotor assembly.

Figure 11A:
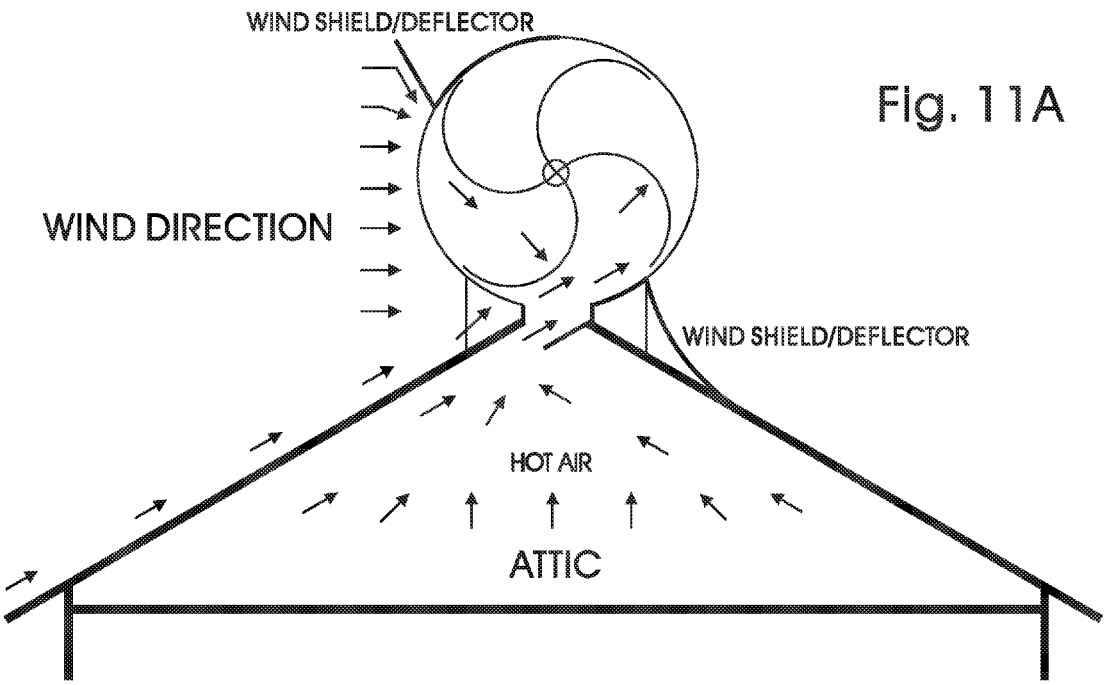
FIGS. 11A and 11B illustrate the interaction of two wind flow directions in accordance with windshield-deflector alignment and rotation direction of rotors on both sides of a pitched rooftop of a horizontally aligned operational position Savonius rotor type wind turbine.
Figure 11B:
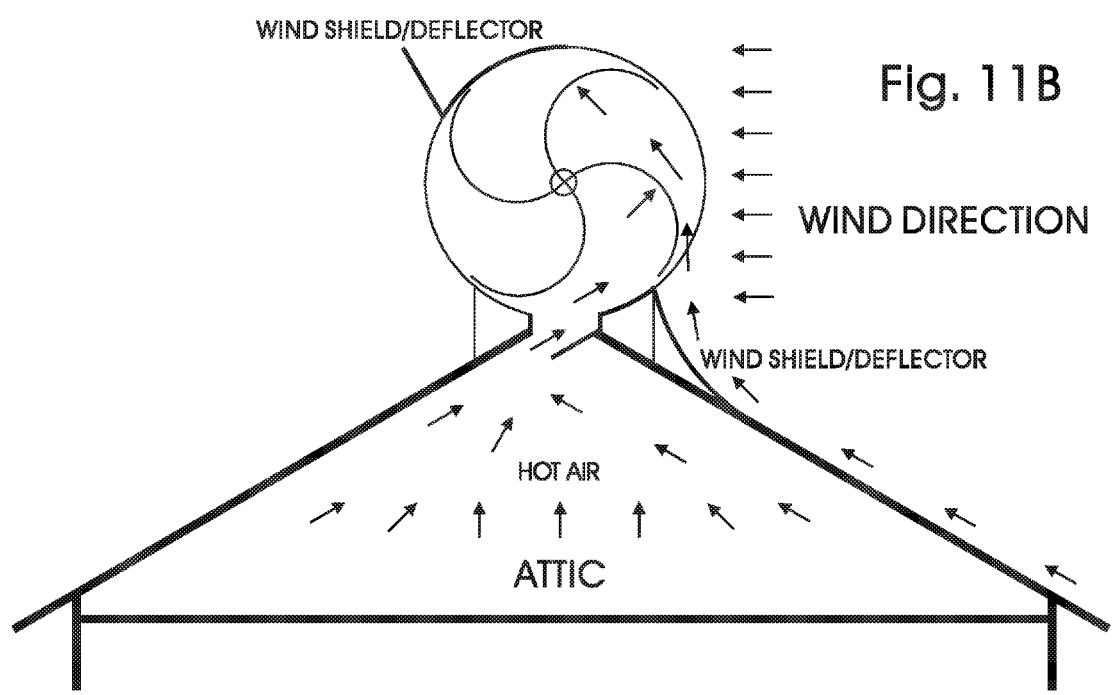

FIGS. 11A and 11B show the rotation of four rotor blades in a horizontally aligned wind turbine under wind loads from different direction and subject to interactions from various types wind shield/deflector structures.

Referring to FIG. 11A, the fixed position windshield 41 has an actuate-cylindrical body portion. Each wind deflector 42 is angle mounted on the outside edge of a corresponding windshield 41 against the wind flow for directing the wind towards the rotor blades at a more efficient angle. The deflected and oncoming wind flow is aligned with the rotating direction of the rotors. The windshield and deflectors also block wind flow from using the rotors to move in a direction opposite the wind flow. Another fixed position windshield/deflector 41/42 is mounted on the pitched rooftop and adjacent to the periphery of the horizontal aligned wind turbine for directing the wind towards the rotor blades at a more efficient angle. The deflected and oncoming wind flow is also aligned with the rotating direction of the rotors as shown in FIG. 11B.

Reversed Stirling Cycle Engines

A reversed Stirling cycle engine (e.g., Stirling heat pump or cooler) is essentially a Stirling cycle engine, running backwards. Such an engine receives mechanical power and uses it to move heat from one place to another. Because this involves extraction of heat, the engine becomes increasingly colder as more and more power is provided to the engine to pump the heat that is absorbed from the environment away from the system.

Figure 12:
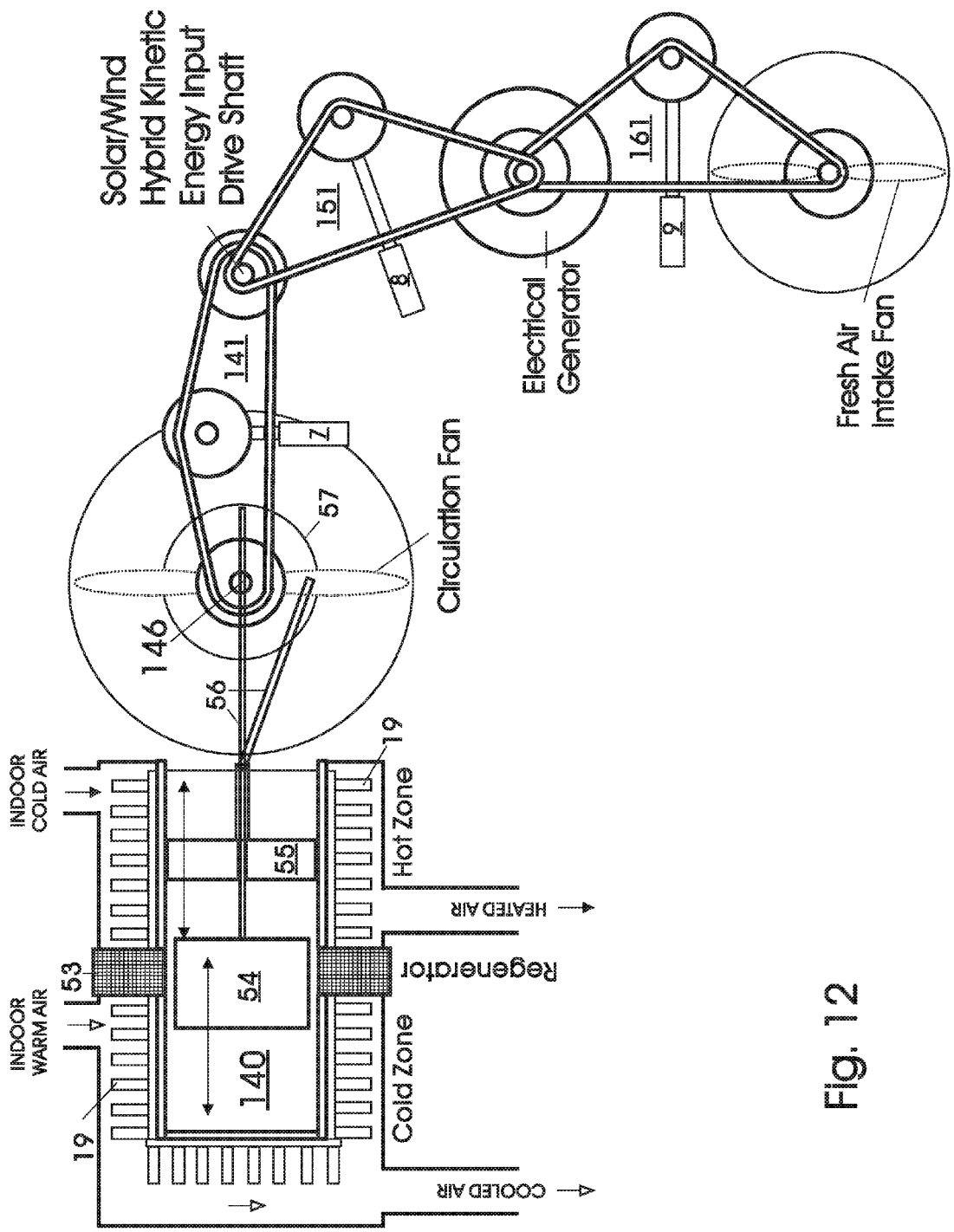
FIG. 12. illustrates the top view of engage/disengage couplings between reversed Stirling cycle engines, electrical generator, circulation fan, fresh air intake fan and engage/disengage electric motors

Referring to FIG. 12, the reversed Stirling cycle engine 140 includes a hot zone 50, a cold zone 51, a displacer piston 54, a power piston 55, crankshafts 56, a flywheel 57, a main drive shaft 146 and a regenerator 53. The regenerator 53, which is generally located between the hot zone 50 and the cold zone 51 of the reversed Stirling cycle engine 140, includes a matrix of fine wire. The mechanical linkages of crankshafts 56 rotate flywheels 57 that are affixed to the same main drive shaft 146 of the multiple stacked reversed Stirling cycle engines 140. The hot zone 50 of the engine 140 includes a radiator-type heat sink 19 (e.g., a heat dissipating device) with fins and/or other means of increasing the surface area that covers the hot zone. The cold zone 51 of the engine also includes a radiator-type heat sink 19 (e.g., a heat absorbing device) with fins and/or other means of increasing the surface area that covers the cold zone.

FIG. 12 also shows the corresponding layout of a reversed Stirling cycle engine 140, an electrical generator 150, a circulation fan 5, a fresh air intake fan 6 and interconnection subsystems 141, 151, 161.

Figure 13:
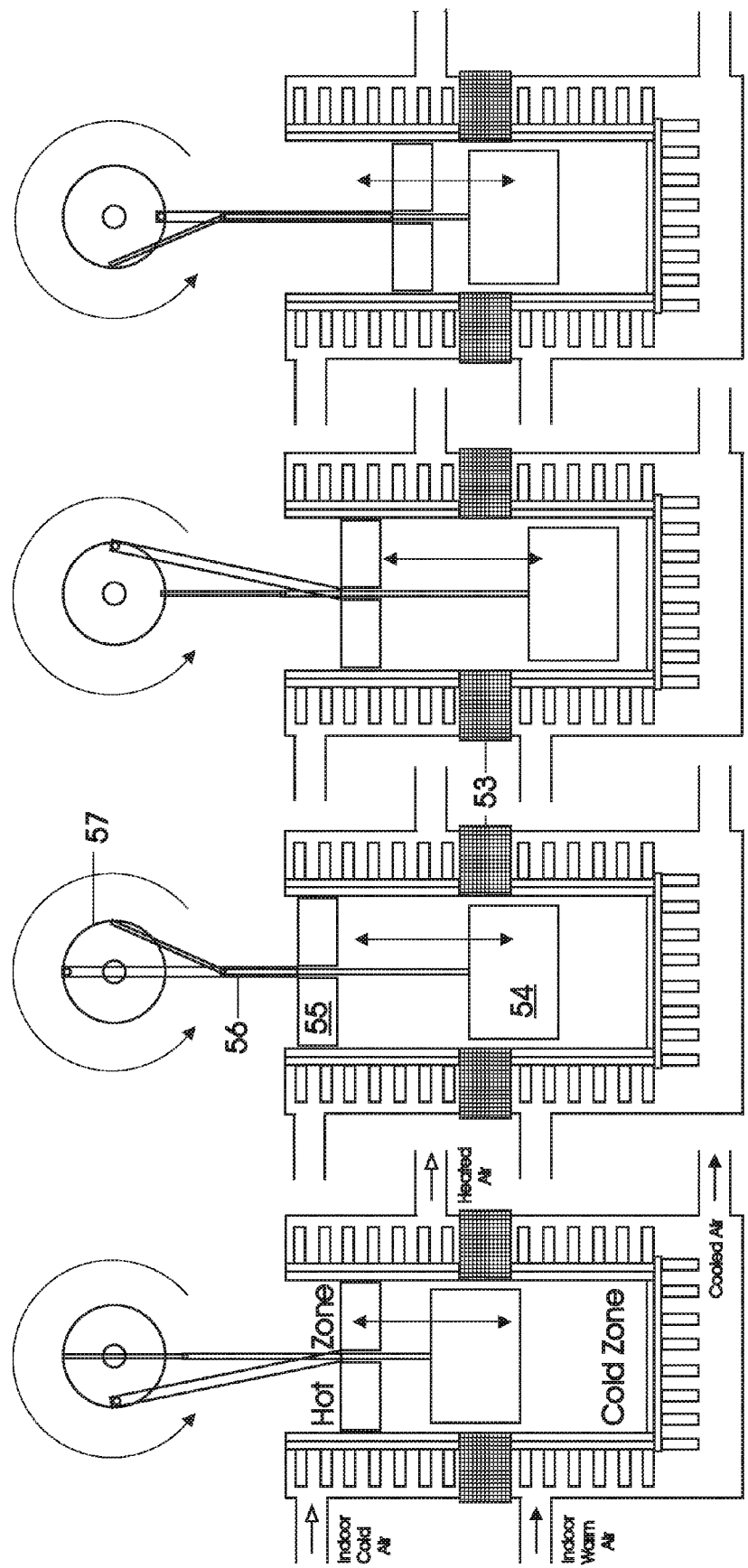
FIG. 13 shows a top view of four representative positions of the reversed Stirling cycle engine of FIG. 12 in a reversed Stirling cycle.

FIG. 13 shows snapshots of four representative positions of the reversed Stirling cycle engine pistons 54, 55, crankshafts 56 and flywheel 57.

Engage/Disengage Mechanisms

Figures 14A, 14B, 14C:
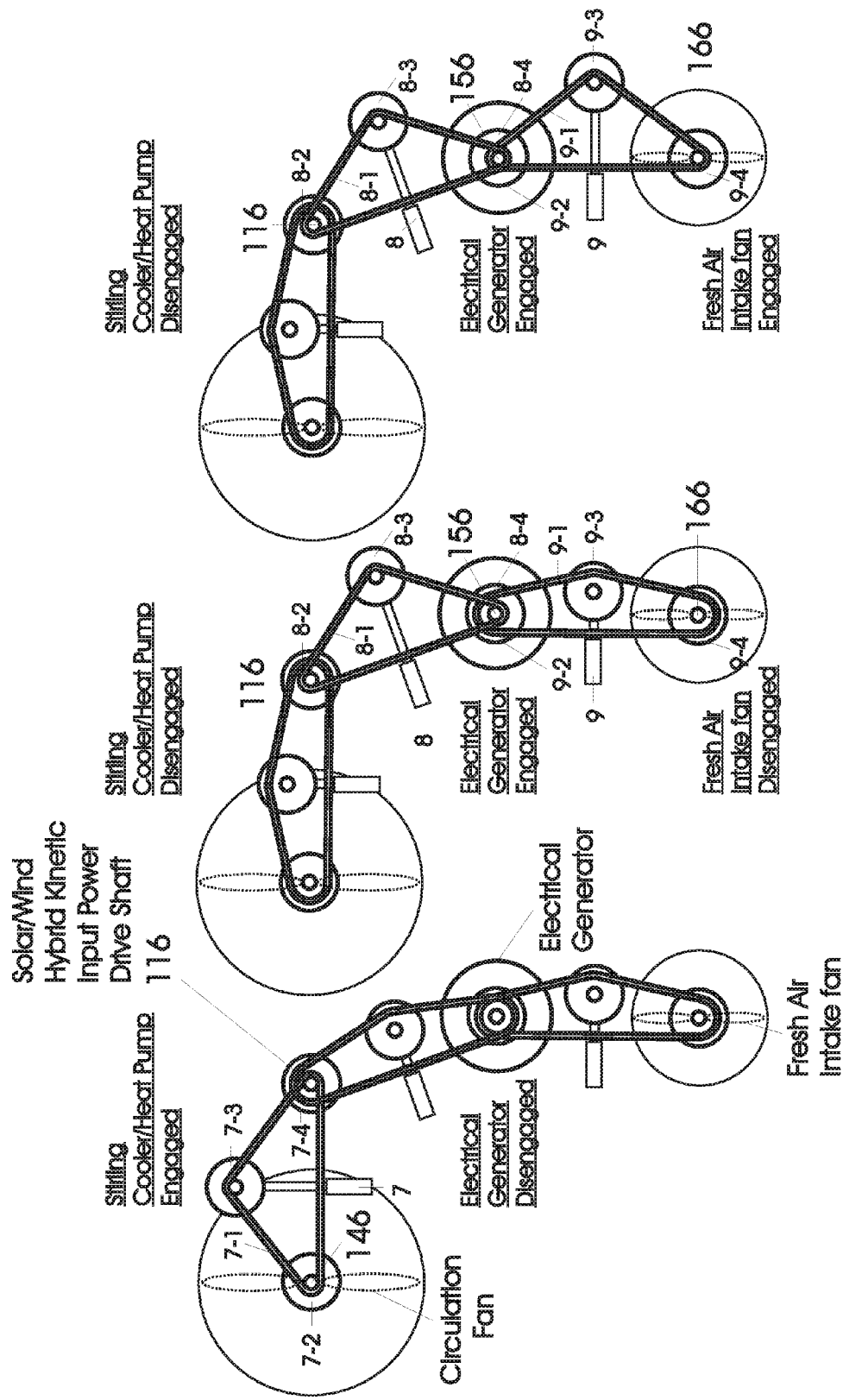
FIGS. 14A-C shows a top view of operational positions of three engage-disengage mechanisms of the reversed Stirling cycle engines, electricity generation system, fresh air intake fan and three respective engage/disengage electric motors.

FIGS. 14A-14C show a sequence of three operations carried out by the three engage-disengage mechanisms.

The interconnection subsystems 141, 151 and 161 include control modules for generating the control signal for activating the electric motors 7, 8, 9 in response to environmental conditions, for instance, wind conditions, sun conditions, and temperature conditions in the insulated enclosures 20, 21 of the reversed Stirling cycle engines 140 and inside the building or refrigerator. In some examples, the control module includes temperature sensors for detecting the temperature, and thermostats for providing the control modules with information concerning the temperature. As described above, a single control module can also be used to control all the subsystems.

FIG. 14A shows the engage-disengage electric motor 7 activated (e.g., by thermostat) to selectively extend and tighten a V-belt 7-1 so that the pulleys 7-2, 7-3 and 7-4 are all engaged. This causes kinetic power to be transferred from the solar/wind subsystem's main drive shaft 116 to the reversed Stirling cycle engines main drive shaft 146, to which circulation fan 5 is coupled.

Soon after the room temperature reaches another set temperature, the thermostat activates the engage-disengage electric motor 7 to retract and loosen the V-belt 7-1 on the pulleys 7-2, 7-3, 7-4. This disengages the solar/wind subsystem's drive shaft 116 from the reversed-Stirling engine's drive shaft 146. The engage-disengage electric motor 8 then extends and tightens the V-belt 8-1 so that it engages the pulleys 8-2, 8-3, 8-4. As a result, the solar/wind subsystem's drive shaft 116 engages the electrical generator's drive shaft 156, as shown in FIG. 14B. The hybrid solar/wind power subsystem 110 then functions solely as an electrical generator.

If fresh air is not needed, the engage-disengage electric motor 9 retracts and loosens the V-belt 9-1 from the pulleys 9-2, 9-3, 9-4. This disengages the fresh air intake fan 6 and removes the weight load and mechanical friction associated with the fan's driving mechanisms, as also shown in FIG. 14B.

When fresh air is needed, The engage-disengage motor 9 engages main drive shaft 166 of the fresh air intake fan 6 with the main drive shaft 156 of the electrical generator 150 to activate the fresh air intake fan 6, thereby bringing fresh air into the building, as shown in FIG. 14C.

The working sequence is carried out selectively by a control module that generates a control signal for activating the electric motor 7, 8, 9 in response to environmental and system conditions. Exemplary conditions to which the control module responds include wind, sun, and temperature both within the insulated enclosures 20, 21 of the reversed Stirling cycle engines 140 and inside the building or refrigerator. In some examples, some or all of the nine pulleys have large flanges to hold the V-shaped belt in the grooves when the belt is slack (disengaged).

Figure 15A:
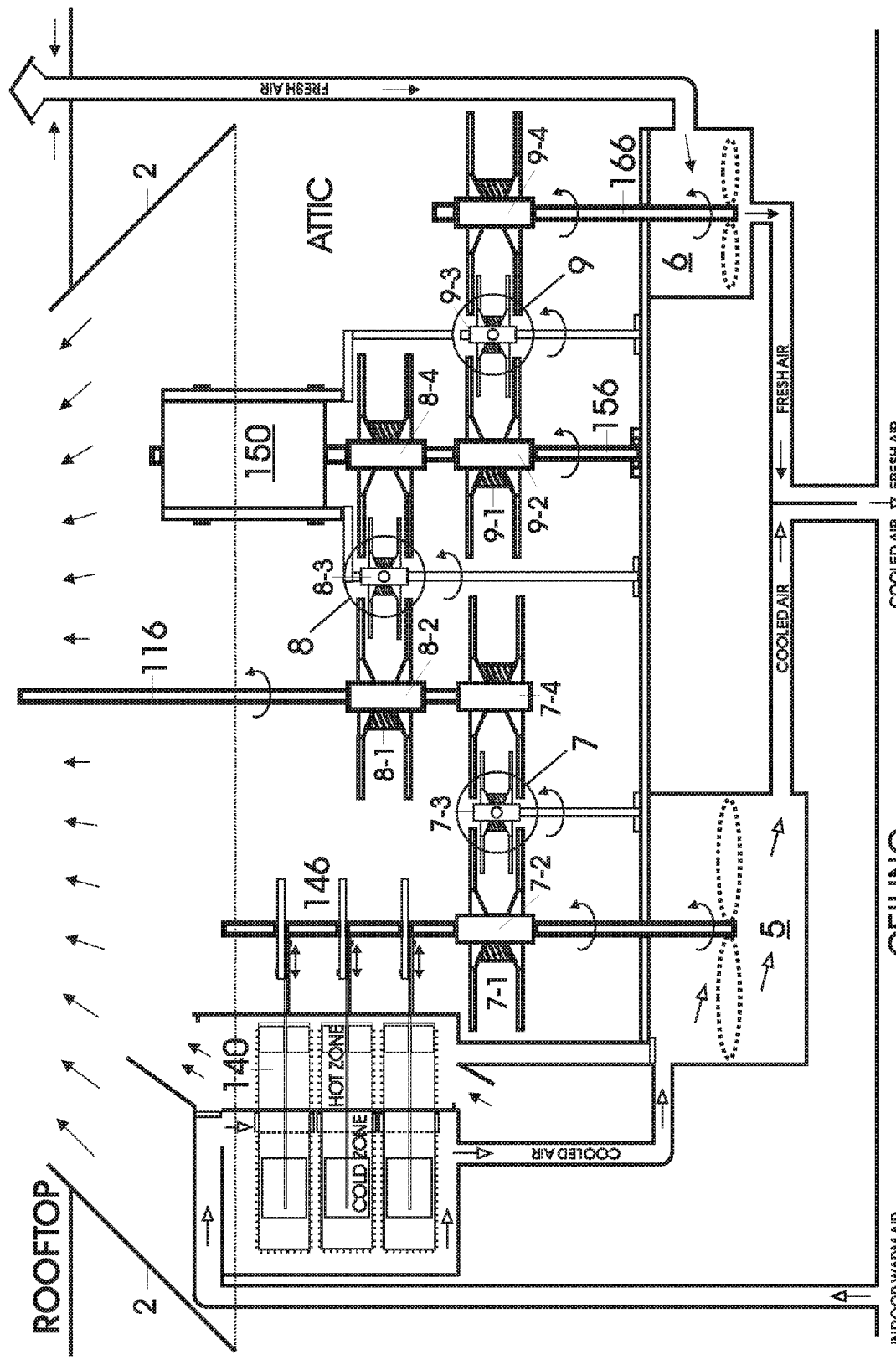
FIG. 15A illustrates the side view of engage/disengage couplings between reversed Stirling cycle engines, electrical generator, circulation fan, three respective engage/disengage electric motors and fresh air intake fan.

Referring to FIG. 15A, the engage/disengage mechanisms include motors 7, 8, 9 coupled to V-belts 7-1, 8-1, 9-1, which are selectively coupled and decoupled by the control module from sets of pulleys 7-2, 7-3, 7-4, 8-2, 8-3, 8-4, 9-2, 9-3, 9-4 that interconnect among reversed Stirling cycle engines 140/ the circulation fan 5, the electrical generator 150 and the fresh air intake fan 6 in response to changing environmental and system conditions.

In some embodiments, the pulleys may have different diameters. These different diameters make it possible to rotate shafts at different speeds. For example, the system can rotate the shafts at 300 rpm for hybrid solar/wind power source, 900 rpm for the reversed Stirling cycle engines, 1200 rpm for the electrical generator, and 600 rpm for the fresh air intake fan. The rate at which each driving pulley rotates may be pre-determined or changeable for maximizing the system efficiency, as shown in FIG. 15B.

Extensions and Applications

There can be many applications in which the systems and methods described above can be useful. For instance, the system may be readily adapted to convert solar and wind hybrid energy to provide power for refrigeration, in supermarkets, stores, offices, or residences.

Various types of refrigeration may be deployed in the system. For example:

FIG. 16 shows a further embodiment of the refrigeration capacity in commercial refrigeration demand locations (e.g., supermarkets, stores, and offices) or residential uses. As shown, the multiple reversed Stirling cycle engines 140 can be coupled to a radiator-type heat exchanger 31 that receives cooled air from the cold zone of the Stirling coolers/refrigerators. The refrigeration of the system 100 can also be used to circulate the cooled air to the heat exchanger 31 of cooler, refrigerator or freezer then back to complete a closed cooling cycle with a back up unit of the auxiliary conventional Freon based compressor.

Various types of operation setup and configuration may be applied.

Figure 17:
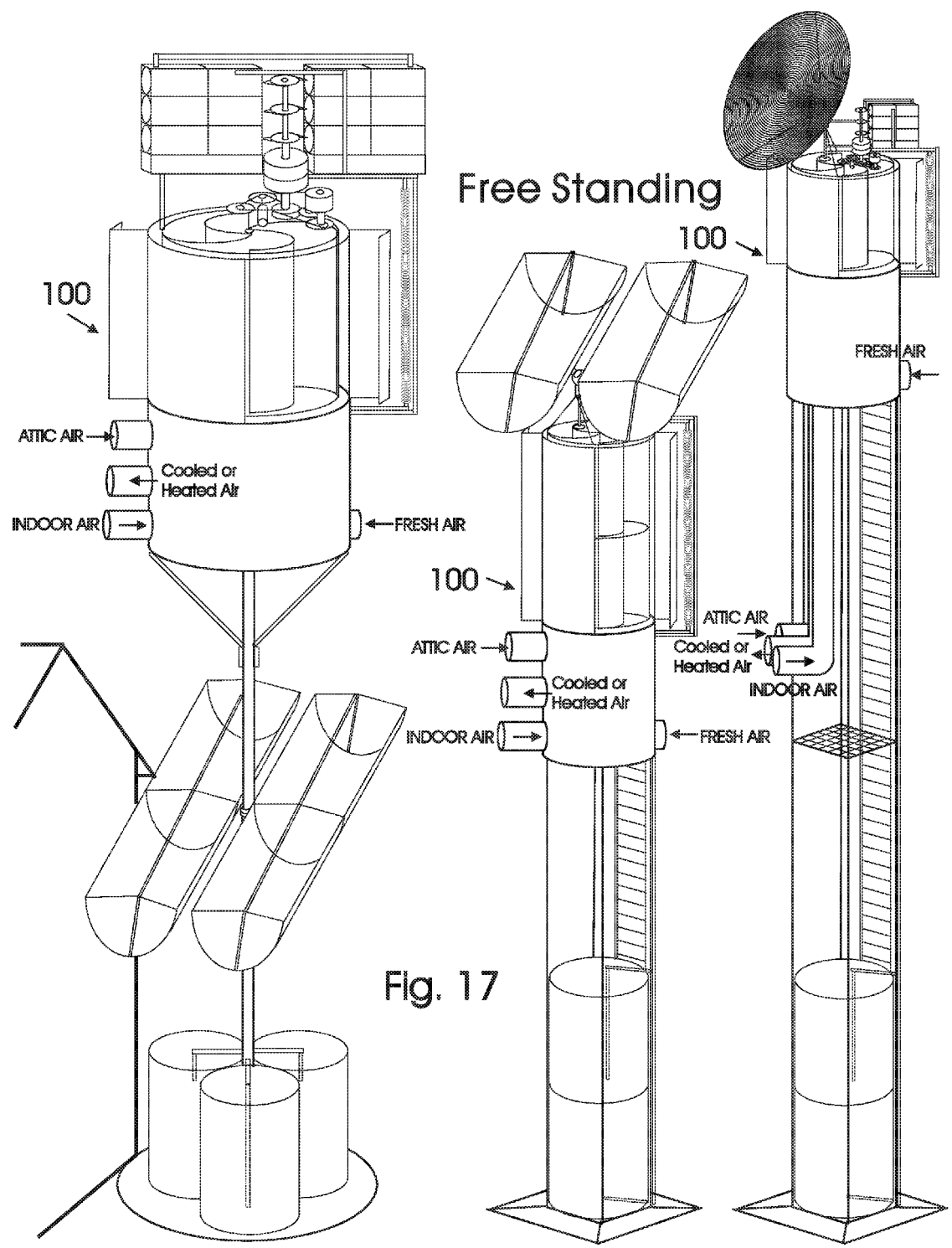
FIG. 17 is a schematic diagram of various configurations of an air-conditioning/refrigeration, space-heating, hot water supply and electricity generation system that can be mounted on tower, pole and other free standing positions and with different kinds of solar collectors.

FIG. 17 shows that the system 100 can be mounted on a high tower, one or more supporting poles, and possibly other free standing structures and with different kinds of solar collectors. For some standing types, the solar collector can be integrated with and mounted either on top or beneath the wind turbine to avoid obstructing the turbine rotor from direct access to prevailing wind. The system 100 can be placed under or between the solar collector and wind turbine to avoid obstructing the solar collecting device and turbine rotor from direct access to sunrays and prevailing wind.

Figure 18:
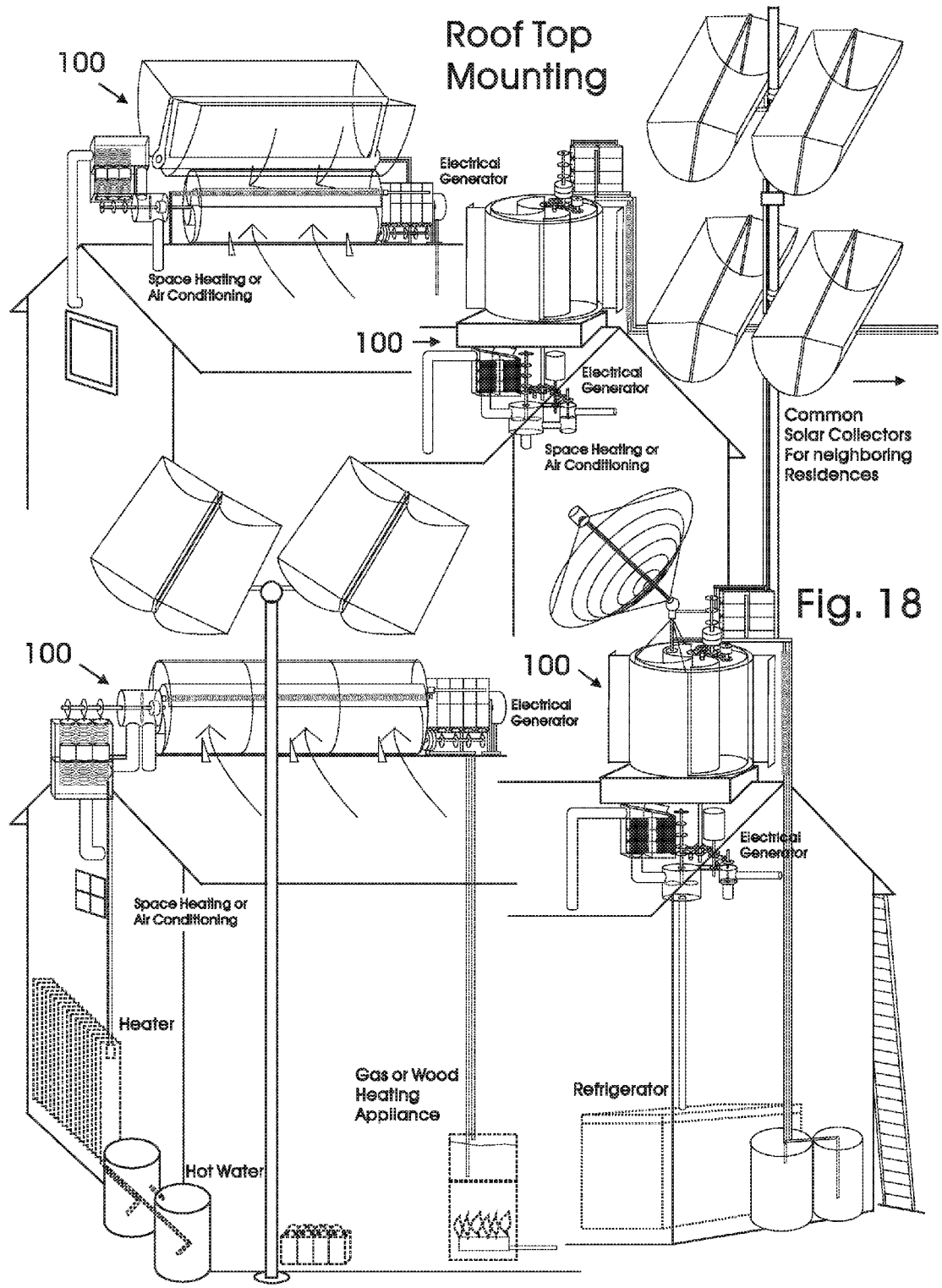
FIG. 18 is a schematic diagram of various configurations of an air-conditioning/refrigeration, space-heating, hot water supply and electricity generation system that can be mounted on pitched rooftop in various operational positions and with common solar collectors to be shared by neighboring residences.
Figure 19:
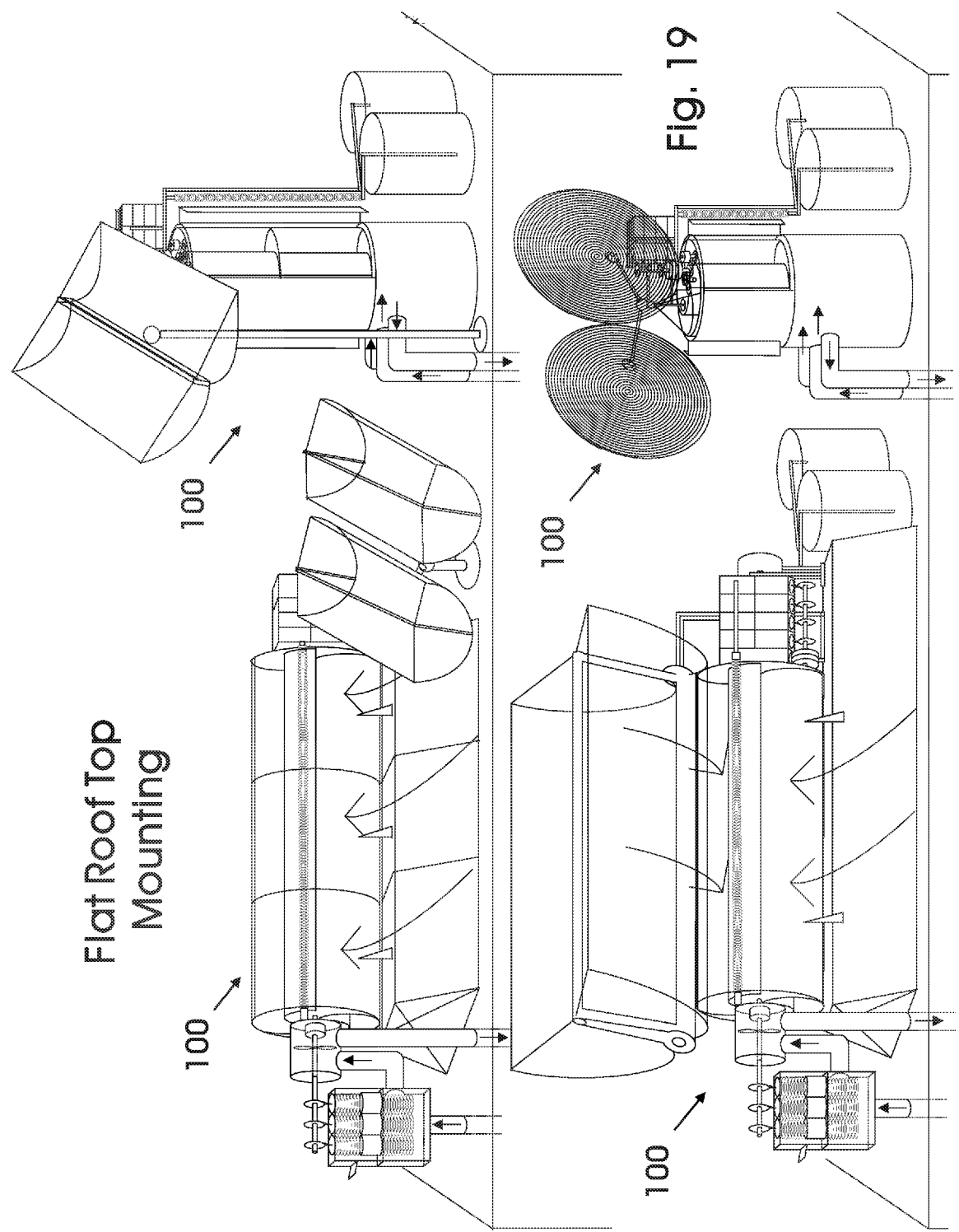
FIG. 19 is a schematic diagram of various configurations of an air-conditioning/refrigeration, space-heating, hot water supply and electricity generation system that can be mounted on flat rooftop in various operational positions and with different kinds of solar collectors.

FIGS. 18 and 19 show further embodiments of system 100 mounted on pitched rooftop and flat rooftop, respectively. FIG. 18 also shows common solar collectors to be shared by neighboring residences or small community and an auxiliary heat source (e.g., gas or wood heating appliance) for the hybrid solar/wind power subsystem 110. In addition to air conditioning/refrigeration and space heating, the system 100 also supplies hot water that is a byproduct from the hybrid solar/wind power subsystem 110.

For some roof-mounted types as shown in FIG. 18 and FIG. 19, the system 100 can be placed in an attic, under or by the side of the solar collector and wind turbine, to fully utilize and adapt to the building structure and environment.

Figure 20:
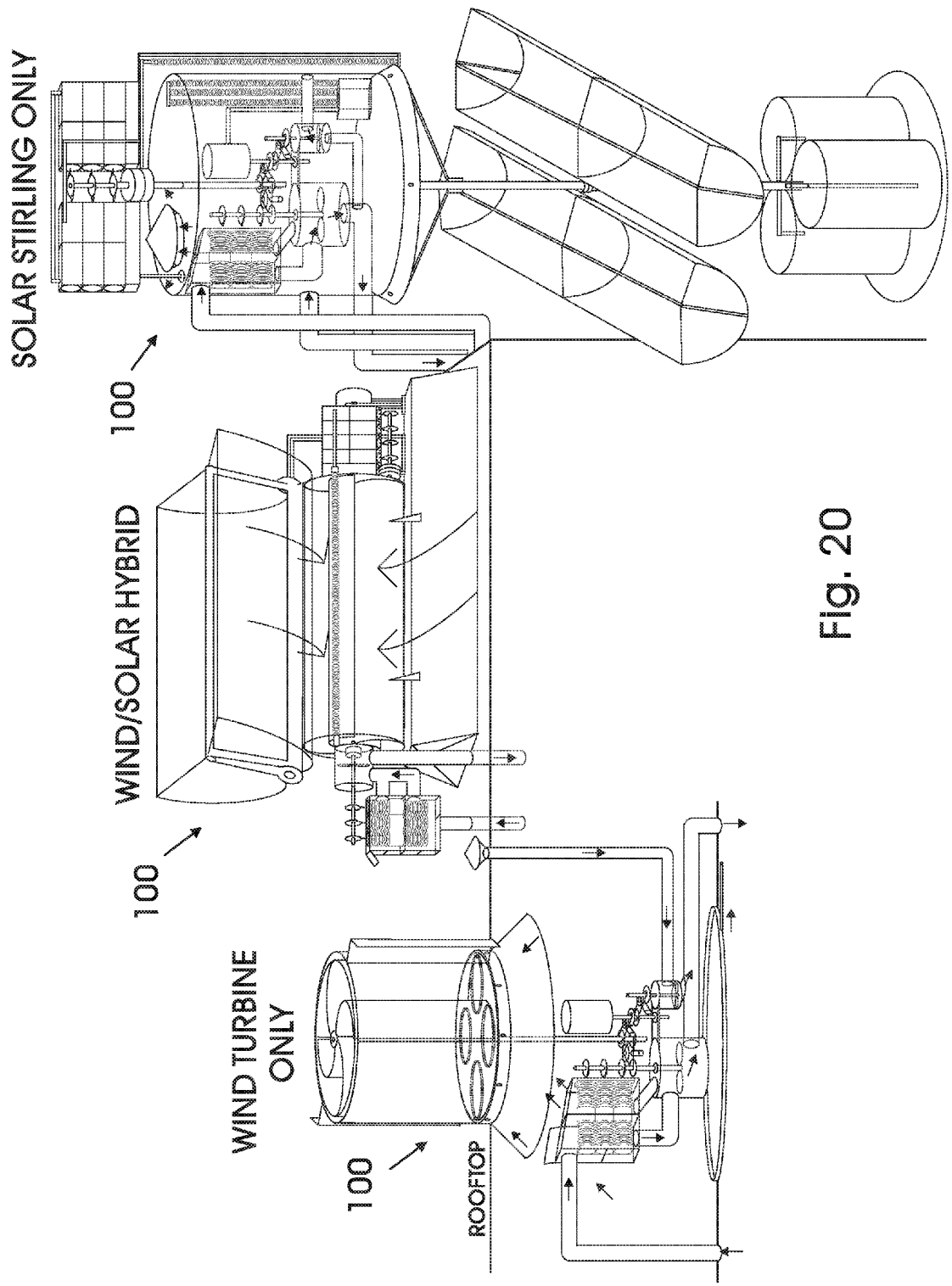
FIG. 20 shows various configurations of the renewable energy powered air-conditioning/refrigeration, space-heating, hot water supply and electricity generation system, including solar collector type system with hot water supply, wind turbine type system without hot water supply and hybrid solar/wind kinetic powered type system with hot water supply.

FIG. 20 shows examples of three types of power supply that can be used in the Stirling coolers, heat pumps and electricity generation systems, including wind turbine powered system without hot water supply, solar Stirling engines powered system with hot water supply and solar/wind hybrid powered system with hot water supply.

Figure 21:
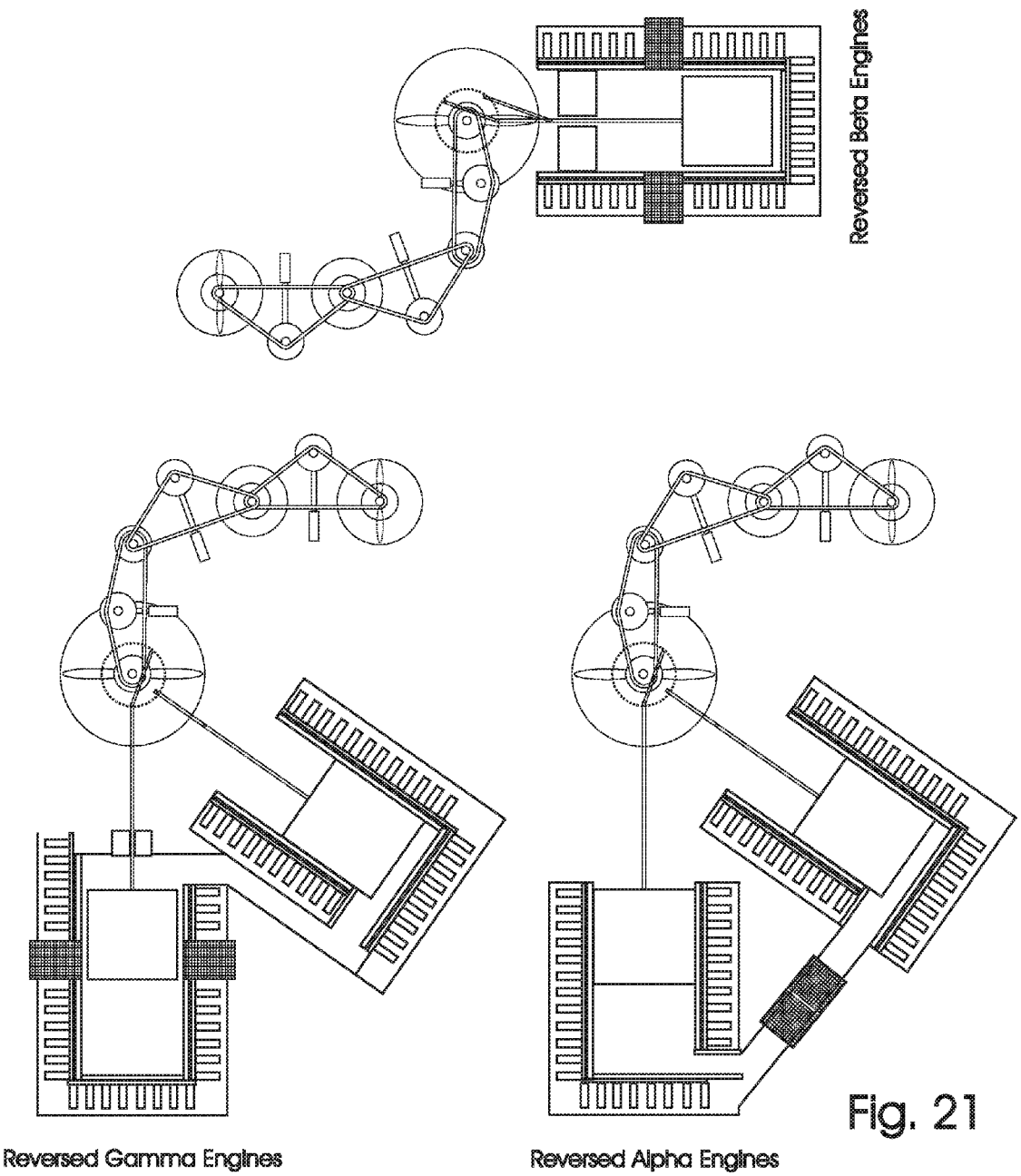
FIG. 21 shows various types of reversed Stirling cycle engine layouts, including an Alpha type, a Beta type, and a Gamma type.

FIG. 21 shows examples of three types of reversed Stirling cycle engines that can be used in the hybrid systems, including Alpha engines, Beta engines and Gamma engines. These engines are distinguished by the way that they move the air between the hot and cold zones of the cylinder. Other types of reversed Stirling cycle engines or thermo-mechanical engines can also be used.

In some implementations, solar collectors (e.g., parabolic dish and trough etc.), wind rotors, wind funnel, air chutes, insulated enclosures and insulated air ducts may be made of high strength, durable, non-corrosive, shock absorbent, vibration dampening and lightweight advanced composites (glass fiber and carbon fiber) structures. Also, advanced composites (S glass fiber, carbon fiber and Kevlar fiber) drive shafts, rotary fans and pulleys can be used in the interconnection subsystem to reduce weight. The use of lightweight composite materials enables the hybrid system to operate more efficiently and to be manufactured and maintained at low cost. In addition, because of the structural simplicity of construction and the lightweight of composites, the system is affordable enough to use in small commercial office buildings, and for placement on office rooftops, parking lots, house rooftops or backyards. Furthermore, the system can be used to meet household/small-business energy demands in both urban and suburban areas at a cost affordable even in developing countries.

It is to be understood that the foregoing description is intended to illustrate and not to limit the scope of the invention, which is defined by the scope of the appended claims. Other embodiments are within the scope of the following claims.

The invention claimed is:
1. A system for converting solar and wind hybrid energy for use with a stack of reversed thermo-mechanical engines for at least one of air-conditioning/refrigeration, space-heating, hot water supply and electricity generation, said system comprising:

(1) a wind and solar hybrid powered subsystem including:
- a solar collector for receiving solar energy to generate thermal energy;
- stacked thermo-mechanical engines coupled to the solar collector for converting the generated thermal energy into mechanical energy;
- a rotor mounted for rotation in response to wind incident thereon; and
- a first shaft mechanically coupled between the rotor and the thermo-mechanical engines; and (2) a stacked reversed thermo-mechanical engine subsystem including:
- stacked reversed thermo-mechanical engines coupled to the wind and solar hybrid powered subsystem for converting the mechanical energy generated by the wind and solar hybrid powered subsystem into energy for controlling temperature in a space, wherein the energy is used for at least one of air-conditioning, refrigeration and space-heating;
- a second shaft mechanically coupling the stacked reversed thermo-mechanical engines to a circulation fan;

(3) a third shaft coupled to an electrical generator; and
(4) a fourth shaft coupled to a fresh air intake rotary fan; and an interconnection subsystem configured for disengageably coupling a pair of shafts, wherein the pair shafts is selected from the group consisting of
- the first shaft and the second shaft, for transferring the generated mechanical energy of the wind and solar hybrid powered subsystem to the stacked reversed thermo-mechanical engines subsystem,
- the first shaft and the third shaft, for transferring the generated mechanical energy of the wind and solar hybrid powered subsystem to the electrical generator, and
- the third shaft and the fourth shaft, for coupling mechanical energy between the electrical generator and the fresh air intake rotary fan.

2. The system of claim 1, wherein the reversed thermo-mechanical engine subsystem includes at least one reversed Stirling cycle heat pump/cooler.

3. The system of claim 1, further including a wind funnel structure mounted beneath the rotor.

4. The system of claim 3, wherein the wind funnel structure includes a set of one or more air chute members symmetrically positioned under the rotor, and wherein the air chute members are aligned to direct air in a direction for urging the rotor to rotate in response to wind incident thereon.

5. The system of claim 4, wherein the wind funnel structure and air chute members further include controlled airway shut-off mechanisms.

6. The system of claim 3, wherein the wind funnel structure further includes a drainage subsystem for draining precipitation falling through the wind chutes, the drainage subsystem comprising a set of drain holes, a drain pan positioned to receive precipitation falling through an air chute and airway openings, and drain lines for draining the drain pan.

7. The system of claim 1, wherein the wind and solar hybrid powered subsystem further includes a fixed windshield structure having an arcuate-cylindrical member positioned outside a periphery of the rotor for blocking wind flow to the backside of the rotors, therefore preventing the wind from inhibiting the rotation of the rotors.

8. The system of claim 7, further including a deflector angle-mounted at the outer edge of the rotor for deflecting wind in a direction to urge rotation of the rotor.

9. The system of claim 1, wherein the wind and solar powered hybrid subsystem further includes a second wind shield/deflector configured to be mounted on a roof that is adjacent to the rotor for directing wind flow toward a desired region of the rotor in a direction selected to urge rotation of the rotor.

10. The system of claim 1, wherein the interconnection subsystem includes a set of pulleys and one or more V-belts for selectively coupling to the set of pulleys.

11. The system of claim 10, wherein the interconnection subsystem further includes one or more electric motors configured for moving a selected one of the set of pulleys upon activation by a control signal, thereby tightening the V-belts over the set of pulleys to couple one shaft to another shaft.

12. The system of claim 10, further comprising an electric motor for selectively causing coupling between the V-belt and the set of pulleys, and a control module for generating a control signal for activating the electric motor in response to environmental and system conditions.

13. The system of claim 12, wherein the environmental and system conditions include one or more of a wind condition, a sun condition and a temperature condition.

14. The system of claim 1, wherein the interconnection subsystem includes one or more sets of electromagnetic clutches.

15. The system of claim 14, further comprising a control module for generating a control signal for activating the electromagnetic clutches in response to environmental and system conditions.

16. The system of claim 1, wherein the reversed thermo-mechanical engines include walls defining a hot-zone insulated enclosure and walls defining a cold-zone insulated enclosure.

17. The system of claim 16, further including one or more air hatch doors and air duct valves for enabling air to pass into or out of the enclosures in response to activation of a control signal.

18. The system of claim 17, further comprising a control module for generating the control signal for activating the air hatch doors and air duct valves in response to environmental and system conditions.

19. The system of claim 1, further comprising an air circulation system for circulating air between the insulated enclosures of the stacked reversed thermo mechanical engines and a space in which temperature is to be controlled.

* * * * *